(12) United States Patent
Cooper et al.

(10) Patent No.: US 10,761,571 B1
(45) Date of Patent: Sep. 1, 2020

(54) LINKAGE ASSEMBLY FOR A PORTABLE ELECTRONIC DEVICE

(71) Applicant: Apple Inc., Cupertino, CA (US)

(72) Inventors: Edward J. Cooper, Campbell, CA (US); Ari P. Miller, San Francisco, CA (US); Kevin M. Robinson, Sunnyvale, CA (US); Ian A. Guy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/424,332

(22) Filed: May 28, 2019

Related U.S. Application Data

(60) Provisional application No. 62/737,662, filed on Sep. 27, 2018.

(51) Int. Cl.
| | |
|---|---|
| *G06F 1/16* | (2006.01) |
| *F16H 21/44* | (2006.01) |
| *E05D 11/08* | (2006.01) |
| *E05D 3/14* | (2006.01) |

(52) U.S. Cl.
CPC ............... *G06F 1/166* (2013.01); *E05D 3/14* (2013.01); *E05D 11/08* (2013.01); *F16H 21/44* (2013.01); *G06F 1/1616* (2013.01); *G06F 1/1681* (2013.01); *E05Y 2900/606* (2013.01)

(58) Field of Classification Search
None
See application file for complete search history.

(56) References Cited

U.S. PATENT DOCUMENTS

| | | | | |
|---|---|---|---|---|
| 8,599,546 | B2 * | 12/2013 | Nagasaki | G06F 1/1681 16/322 |
| 8,711,554 | B2 * | 4/2014 | Griffin | G06F 1/1616 206/335 |
| 9,696,763 | B2 * | 7/2017 | Mok | H04M 1/0268 |
| 2004/0145862 | A1 * | 7/2004 | Hill | G06F 1/1667 361/679.44 |
| 2012/0275099 | A1 * | 11/2012 | Yamami | H04M 1/0208 361/679.01 |

FOREIGN PATENT DOCUMENTS

CN 203717628 U 7/2014

\* cited by examiner

*Primary Examiner* — Courtney L Smith
*Assistant Examiner* — Rashen E Morrison
(74) *Attorney, Agent, or Firm* — Dickinson Wright RLLP

(57) ABSTRACT

This application relates to a portable electronic device. The portable electronic device includes a housing including (i) a first case, and (ii) a second case that is capable of pivoting relative to the first case. The portable electronic device further includes a linkage assembly that includes a first joint that is joined to the first case, a second joint that is joined to the first case, a third joint that is joined to the second case, where the second and third joints define a first link, and a fourth joint that is joined to the second case, the first and fourth joints defining a second link, where when an input motion is applied at the second link, the second link oscillates to cause the first link to move such that the first and second cases pivot between a closed configuration and an open configuration.

20 Claims, 21 Drawing Sheets

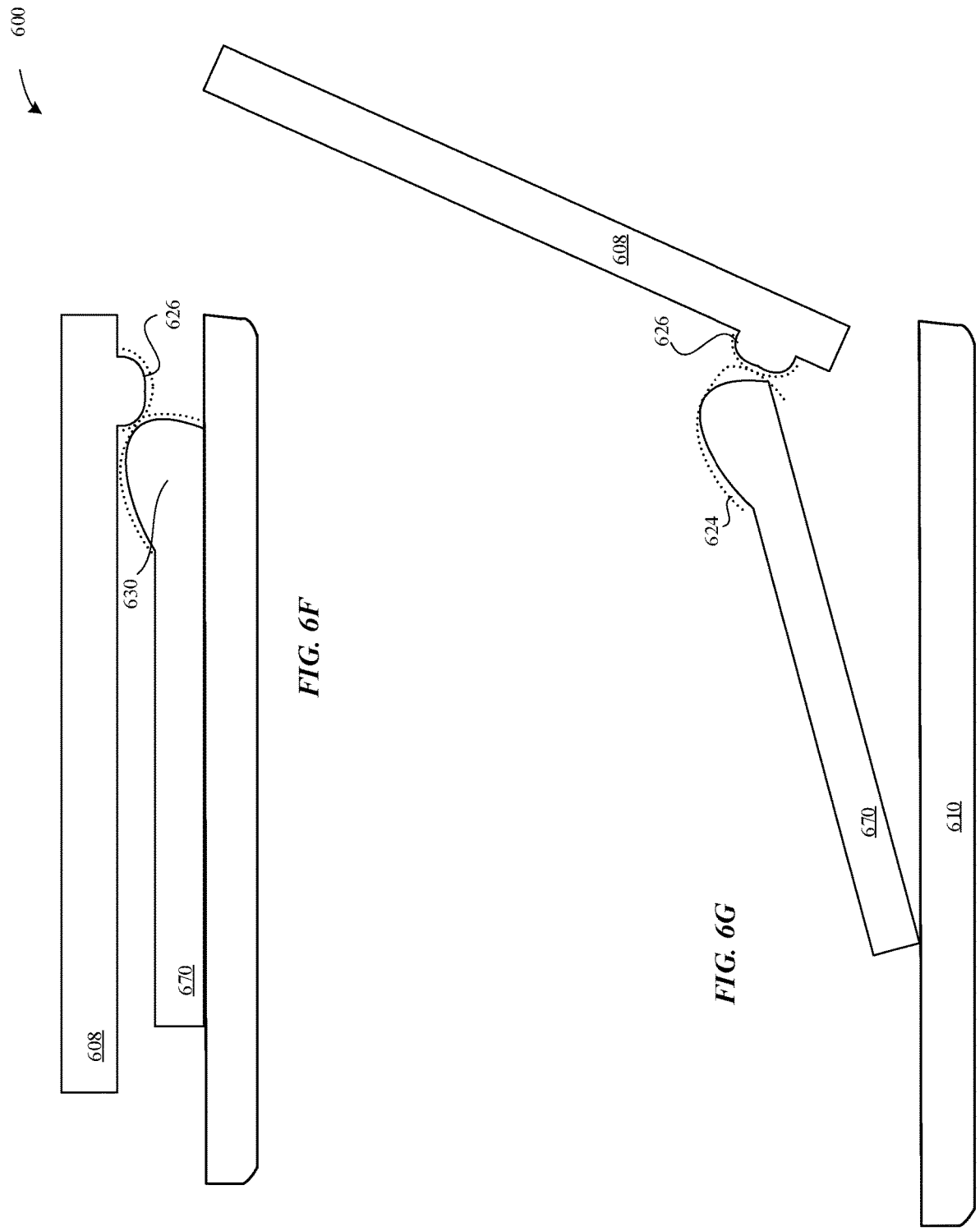

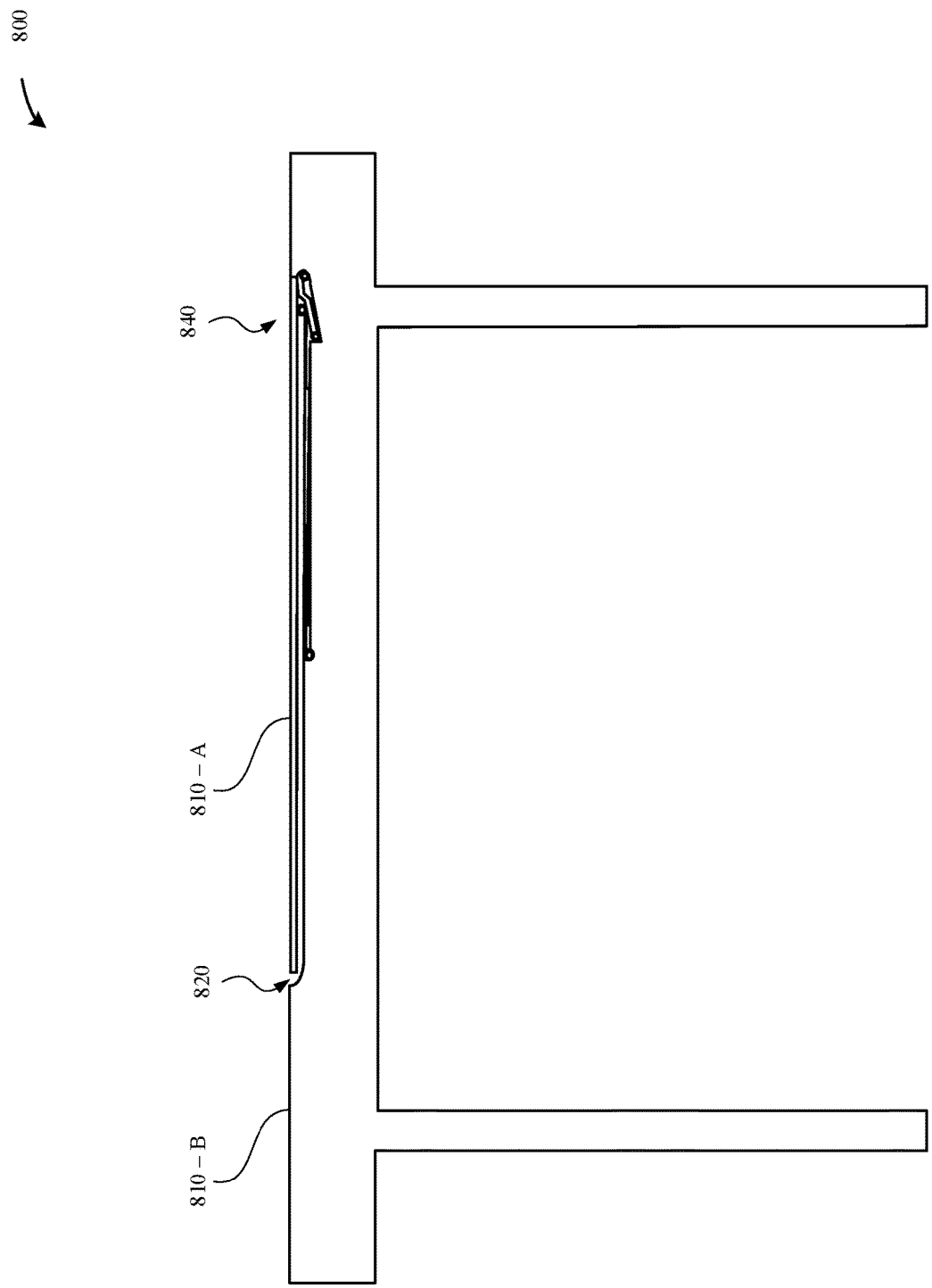

LINKAGE ASSEMBLY FOR A PORTABLE ELECTRONIC DEVICE

CROSS-REFERENCE TO RELATED APPLICATIONS

The present application claims the benefit of U.S. Provisional Application No. 62/737,662, entitled "LINKAGE ASSEMBLY FOR A PORTABLE ELECTRONIC DEVICE," filed Sep. 27, 2018, the content of which is incorporated herein by reference in its entirety for all purposes.

FIELD

The described embodiments relate generally to a linkage assembly for a portable electronic device. More particular, the described embodiments relates to the linkage assembly for transitioning the portable electronic device between a closed configuration and an open configuration.

BACKGROUND

A portable electronic device (e.g., a laptop, etc.) may include multiple operational components for performing complex functions. In particular, the operational components (e.g., keyboard, touchpad, etc.) of the portable electronic device are capable of performing complex functions such as internet browsing, graphic design, word processing, media streaming, etc. However, including these operational components may increase the thickness of the portable electronic device, thereby reducing portability of the portable electronic device. Accordingly, there is a need to include these operational components without increasing the thickness of the portable electronic device.

SUMMARY

This paper describes various embodiments that relate to a linkage assembly for a portable electronic device. In particular, the various embodiments relate to the linkage assembly for transitioning the portable electronic device between a closed configuration and an open configuration.

According to some embodiments, a portable electronic device is described. The portable electronic device includes a housing including (i) a first case, and (ii) a second case that is capable of pivoting relative to the first case. The portable electronic device further includes a linkage assembly that includes a first joint that is joined to the first case, a second joint that is joined to the first case, a third joint that is joined to the second case, where the second and third joints define a first link, and a fourth joint that is joined to the second case, the first and fourth joints defining a second link, where when an input motion is applied at the second link, the input motion causes the second link to oscillate to move the first link such that the first and second cases pivot between a closed configuration and an open configuration.

According to some embodiments, a portable electronic device is described. The portable electronic device includes a housing having (i) a first housing part, and (ii) a second housing part. The portable electronic device further includes a linkage assembly that is (i) joined to the first and second housing parts, and (ii) capable of pivoting the first housing part relative to the second housing part. The linkage assembly further includes a first link that is joined to first and second joints of the first housing part, a second link that is joined to the second joint and a third joint of the second housing part, a third link that is joined to the third joint and a fourth joint of the second housing part, and a fourth link that is joined to the first and fourth joints, where the second link is longer than the fourth link such that when an input force is applied to the fourth link that causes the fourth link to oscillate, the oscillation of the fourth link drives the second link such as to cause the housing to transition between open and closed configurations.

According to some embodiments, a portable electronic device is described. The portable electronic device includes a first case, a second case, and a linkage assembly that pivotally couples the first and second cases. The linkage assembly includes a first link that is coupled to a first set of joints, where the first set of joints are coupled to the first and second cases, and a second link that is coupled to (i) the first link, and (ii) a second set of joints of the first and second cases, where when the first and second cases are in a closed configuration and an input force is applied to the first link, (i) the first link translates in a horizontal motion towards the second link, and (ii) the second link translates in a vertical motion that causes the first and second cases to transition to an open configuration.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 6A-6G illustrate various perspective views of a portable electronic device that includes a linkage assembly while the portable electronic device transitions between a closed configuration and an open configuration, in accordance with some embodiments.

FIGS. 8A-8B illustrate side views of a desk that includes an integrated portable electronic device having a linkage assembly, in accordance with some embodiments.

DETAILED DESCRIPTION

Figure 1:
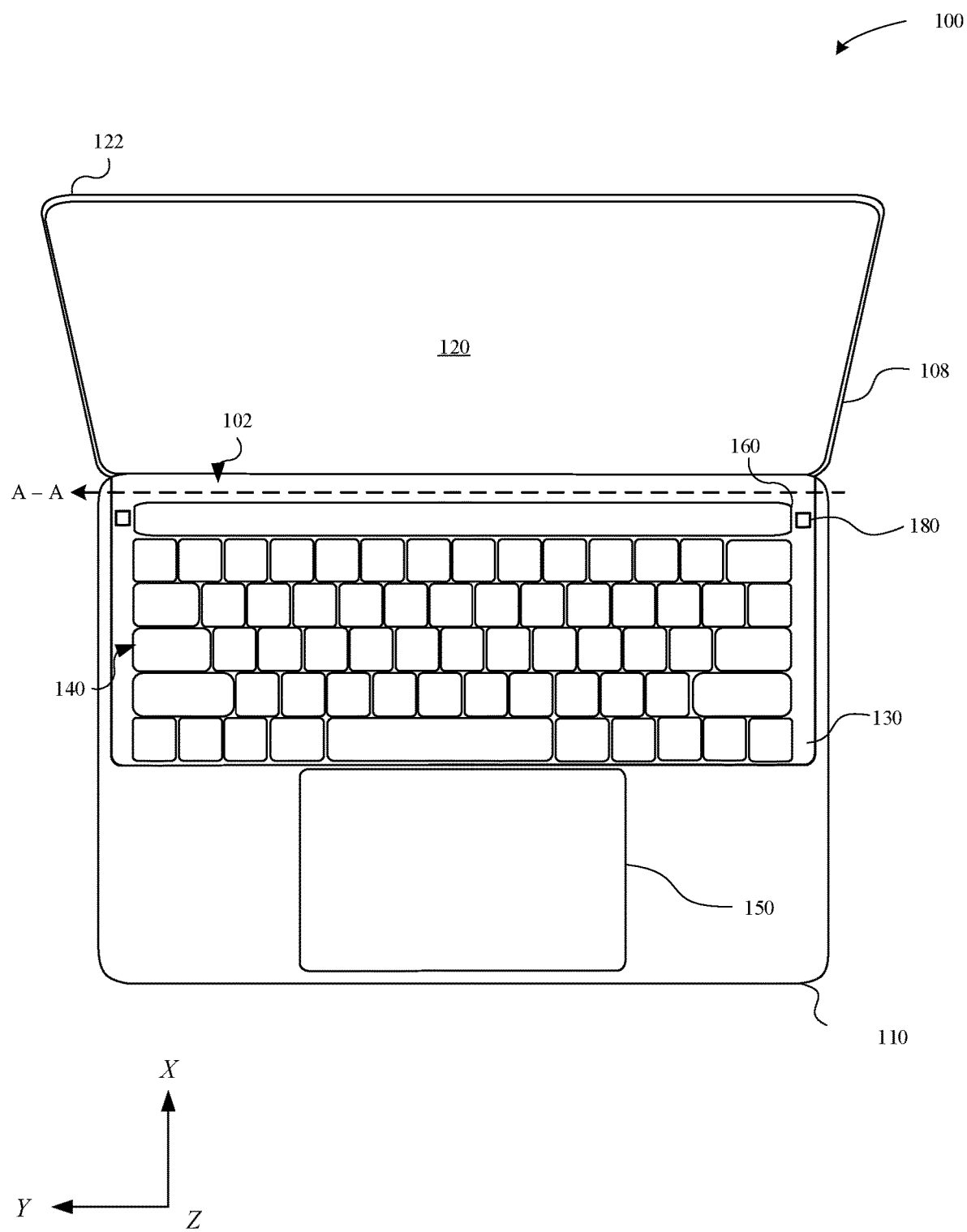
FIG. 1 illustrates a perspective view of a portable electronic device that includes a linkage assembly, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein relate generally to a linkage assembly for a portable electronic device. In particular, the various embodiments relate to the linkage assembly for transitioning the portable electronic device between a closed configuration and an open configuration.

Although portable electronic devices include multiple operational components (e.g., keyboard, touchpad, camera, etc.) for performing multimedia functions (e.g., word processing, media streaming, video chatting, graphic design, etc.), each of these operational components is associated with an amount of thickness that contributes to an overall thickness of an enclosure of the portable electronic device. As additional operational components are incorporated into the portable electronic device, there is a greater need to control the thickness of the enclosure of the portable electronic device to prevent the enclosure from becoming too thick and/or too heavy as these characteristics detract from the portability of the portable electronic device. Additionally, conventional portable electronic devices include hinge assemblies (e.g., rotatable cam shafts, etc.) that require a minimum amount of thickness that is required to hold a display lid at a static angle relative to a base. However, the hinge assembly further contribute to the thickness of the enclosure of the portable electronic device. Furthermore, the hinge assembly requires a minimum amount of sweep clearance for the display lid.

To cure the aforementioned deficiencies, the systems and technique described herein relate to a linkage assembly that replaces a conventional hinge assembly for a portable electronic device. The linkage assembly imparts certain benefits that cannot be realized using the conventional hinge assembly. First, in some aspects, the linkage assembly permits for a single seam between the base portion and the lid portion; thereby, negating any need for large cutouts and notches. Conventional portable electronic devices may utilize hinge assemblies that require large cutouts to accommodate for sweep clearance of the lid portion. Second, in some aspects, the linkage assembly is capable of raising the display lid relative to the base portion. For example, raising the display lid from the base portion and closer to the user may promote greater user ergonomics. Furthermore, the linkage assembly may collapse into itself when the portable electronic device is in the closed configuration. Third, in some aspects, the linkage assembly may be coupled to operational components such as a keyboard, a trackpad, and/or other input devices. The linkage assembly is capable of elevating these operational components closer to the user to promote greater user ergonomics. Fourth, in some aspects, the linkage assembly may be used to expose cooling vents to promote cooling while the portable electronic device is in an open configuration. The linkage assembly may collapse into itself to conceal the cooling vents while the portable electronic device is in a closed configuration. Fifth, in some aspects, the linkage assembly may be used to expose I/O ports while the portable electronic device is in an open configuration. The linkage assembly may collapse into itself to close cooling vents and cover the I/O ports while the portable electronic device is in a closed configuration such as to prevent ingress of contaminants.

According to some embodiments, a portable electronic device is described. The portable electronic device includes a housing including (i) a first case, and (ii) a second case that is capable of pivoting relative to the first case. The portable electronic device further includes a linkage assembly that includes a first joint that is joined to the first case, a second joint that is joined to the first case, a third joint that is joined to the second case, where the second and third joints define a first link, and a fourth joint that is joined to the second case, the first and fourth joints defining a second link, where when an input motion is applied at the second link, the input motion causes the second link to oscillate to move the first link such that the first and second cases pivot between a closed configuration and an open configuration.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a portable electronic device 100 that includes a linkage assembly 102, in accordance with various embodiments. In particular, the portable electronic device 100 utilizes the linkage assembly 102 in substitution of a hinge assembly (e.g., rotatable clutch shaft, etc.) to transition the portable electronic device 100 between an open configuration and a closed configuration. According to some examples, the linkage assembly may also be referred to as a four bar linkage assembly, a closed chained linkage assembly, or a planar bar linkage assembly.

The portable electronic device 100 includes a base portion 110 (also referred to as a top case), which is pivotally coupled to a lid portion 108 (also referred to as a display housing) by way of the linkage assembly 102. Notably, the linkage assembly 102 replaces a conventional hinge assembly/clutch assembly in the embodiments described herein.

FIG. 1 illustrates the portable electronic device 100 in an open configuration. According to some examples, the closed position may correspond to an angle between an internal surface of the lid portion 108 and an internal surface of the base portion 110 that is less than 1°. In some examples, the open position may correspond to an angle between the internal surface of the lid portion 108 and the internal surface of the base portion 110 that is 1° and greater. However, it should be noted that the open and closed positions may correspond to any prescribed range of angles.

According to some embodiments, the lid portion 108 may include a display 120 that is supported by a rear cover 122. The cavity of the lid portion 108 may carry additional operational components such as a camera, a touch layer, and the like. The base portion 110 may include one or more input/output devices, such as a keyboard 140, a touchpad 150, a dynamic multi-functional panel 160, or speakers 180. According to some embodiments, at least one of the keyboard 140, the touchpad 150, the dynamic multi-functional panel 160 or speakers 180 is carried by a chassis 130. The chassis 130 may be capable of pivoting relative to the base portion 110. In particular, because the lid portion 108 is coupled to the chassis 130, an input force that is applied to the lid portion 108 may also cause the chassis 130 to pivot away from the base portion 110.

The linkage assembly 102 may be concealed by the chassis 130 such that the linkage assembly 102 is not viewable from an overhead view of the portable electronic device 100 while in an open configuration, as illustrated in FIG. 1. According to some embodiments, the chassis 130 may be coupled to one or more linkages of the linkage assembly 102. As a result, when the linkage assembly 102 pivots away from the base portion 110, at least one of the keyboard 140, the touchpad 150, the dynamic multi-functional panel 160, or the speakers 180 may be (i) elevated in a vertical motion away from the base portion 110, and (ii) angled in a horizontal motion towards the user who is looking at the display 120 and whose hands are resting on the base portion 110.

The base portion 110 and the lid portion 108 may each include enclosures that define cavities capable of carrying components. According to some examples, each of the lid portion 108 and/or the base portion 110 may have a unibody construction (i.e., formed from a single piece of metal). In other examples, each of the lid portion 108 and/or the base portion 110 may be formed of a combination of at least one of metal (e.g., aluminum, anodized aluminum, titanium, stainless steel, etc.), polymers (e.g., plastic, etc.), graphite fibers, glass, RF-transparent materials, and the like.

FIGS. 2A-2H illustrate various perspective views of a portable electronic device that includes a linkage assembly, where the portable electronic device is capable of transitioning between a closed configuration and an open configuration by using the linkage assembly, in accordance with some embodiments. In particular, FIGS. 2A-2H illustrate different perspective views of the portable electronic device 100 as illustrated in FIG. 1.

Figure 2A:
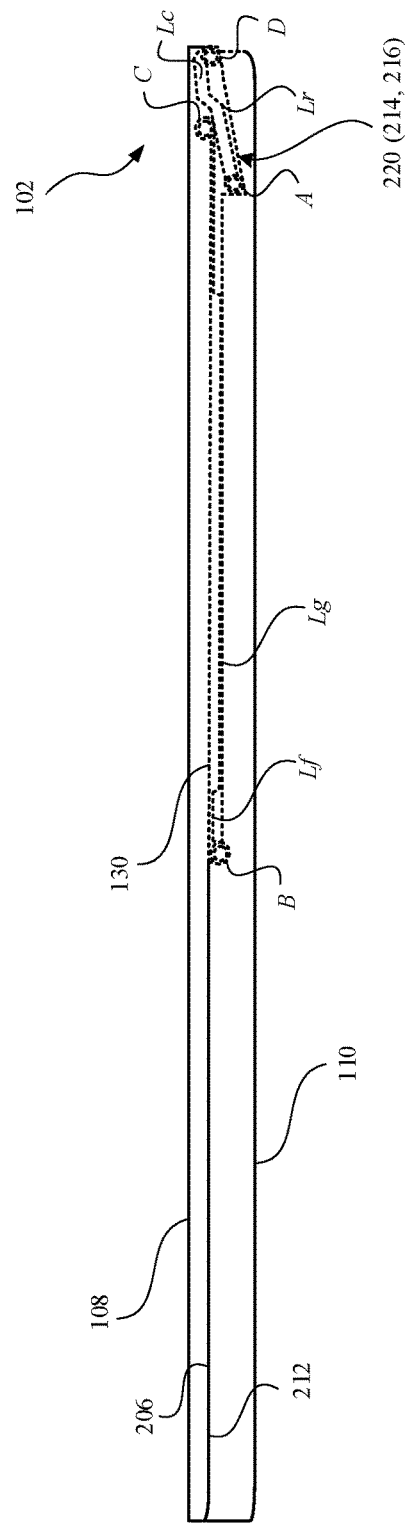
FIGS. 2A-2H illustrate various perspective views of a portable electronic device that includes a linkage assembly while the portable electronic device transitions between a closed configuration and an open configuration, in accordance with some embodiments.

FIG. 2A illustrates a side view of the portable electronic device 100 in a closed configuration, where an internal surface 206 of the lid portion 108 is generally parallel to an internal surface 212 of the base portion 110. The portable electronic device 100 includes the linkage assembly 102, where the linkage assembly 102 is generally concealed within a cavity of the base portion 110 while the portable electronic device 100 is in the closed configuration. As illustrated in FIG. 2A, the base portion 110 includes a linkage assembly—receiving feature 220 capable of carrying one or more joints of the linkage assembly 102. As a result, in the closed configuration, the linkage assembly 102 is viewable nor does protrudes from the thickness of the base portion 110. According to some examples, the linkage assembly—receiving feature 220 may include an angled surface 214 and a recessed surface 216 that are bordered by walls of the base portion 110, as illustrated in FIG. 2A.

The linkage assembly 102 includes a number of joints A, B, C, D that are coupled to different components of the portable electronic device 100. According to some embodiments, the linkage assembly 102 is coupled to a chassis—e.g., the chassis 130. The joints B, C may be coupled to the chassis 130. As described herein, the chassis 130 may correspond to a first link ($L_f$). The chassis 130 may include at least one of the keyboard 140, the touchpad 150, the dynamic multi-functional panel 160, or the speakers 180. In some embodiments, the keyboard 140, the touchpad 150, the dynamic multi-functional panel 160, and/or the speakers 180 may be directly coupled to the linkage assembly 102 and are capable of raised relative to the base portion 110 without also elevating the chassis 130.

According to some embodiments, the joints A, B define a second link ($L_g$). The second link ($L_g$) may also be referred to as a frame link because the second link ($L_g$) is stationary (i.e., does not move) relative to the other links described herein. The second link ($L_g$) may represent a surface of the linkage assembly—receiving feature 220. The second link ($L_g$) may act as a reference for all motions of the other links ($L_f$, $L_c$, $L_r$). The joints B, C define the first link ($L_f$). The joints A, D define a third link ($L_r$). The third link ($L_r$) drives motion of the linkage assembly 102 when an input motion/force is applied to the third link ($L_r$). The joints C, D define a fourth link ($L_c$). According to some embodiments, the first link ($L_f$) is longer than the third link ($L_r$). Joints may be defined as a connection between multiple links ($L_g$, $L_f$, $L_c$, $L_r$) that enables for rotary motion via a pivot. Each of the joints A, B, C, D represent pivot points for their respective links. According to some embodiments, the links ($L_g$, $L_f$, $L_c$, $L_r$) may also be referred to as bars that are connected by joint or joints. Collectively, the links ($L_g$, $L_f$, $L_c$, $L_r$) generate motion of the linkage assembly 102 in a defined closed loop.

The linkage assembly 102 includes joints A, B, C, D, where the joint A is coupled to a proximal portion of the base portion 110. The joint B is coupled to a proximal portion of the chassis 130. In some examples, the proximal portion of the chassis 130 may include the keyboard 140, the touchpad 150, and/or a palm rest area for the user's hand. The joint D is coupled to a distal portion of the lid portion 108, and the joint D is capable of moving independently of the base portion 110. In the closed configuration, the joint D rests against the angled surface 214 of the linkage assembly—receiving feature 220, and the joint B is capable of oscillating relative to the angled surface 214. The joint C is coupled to a proximal portion of the chassis 130. In some examples, the distal portion of the chassis 130 may include the keyboard 140 and/or the dynamic multi-functional panel 160. The joint C is capable of oscillating relative to the recessed surface 216 of the linkage assembly—receiving feature 220.

According to some embodiments, the joints A, B define a second link ($L_g$) that includes the base portion 110, the joints B, C define a first link ($L_f$) that includes the chassis 130, the joints C, D define a fourth link ($L_c$) that includes the lid portion 108, and the joints A, D define a third link ($L_r$). When an input motion is applied to the third link ($L_r$), the third link ($L_r$) is capable of lifting the chassis 130 relative to the base portion 110. In turn, lifting the chassis 130 may also raise the lid portion 108 by raising the joint D relative to the angled surface 214, as will be described with reference to FIG. 2B.

Figure 2B:
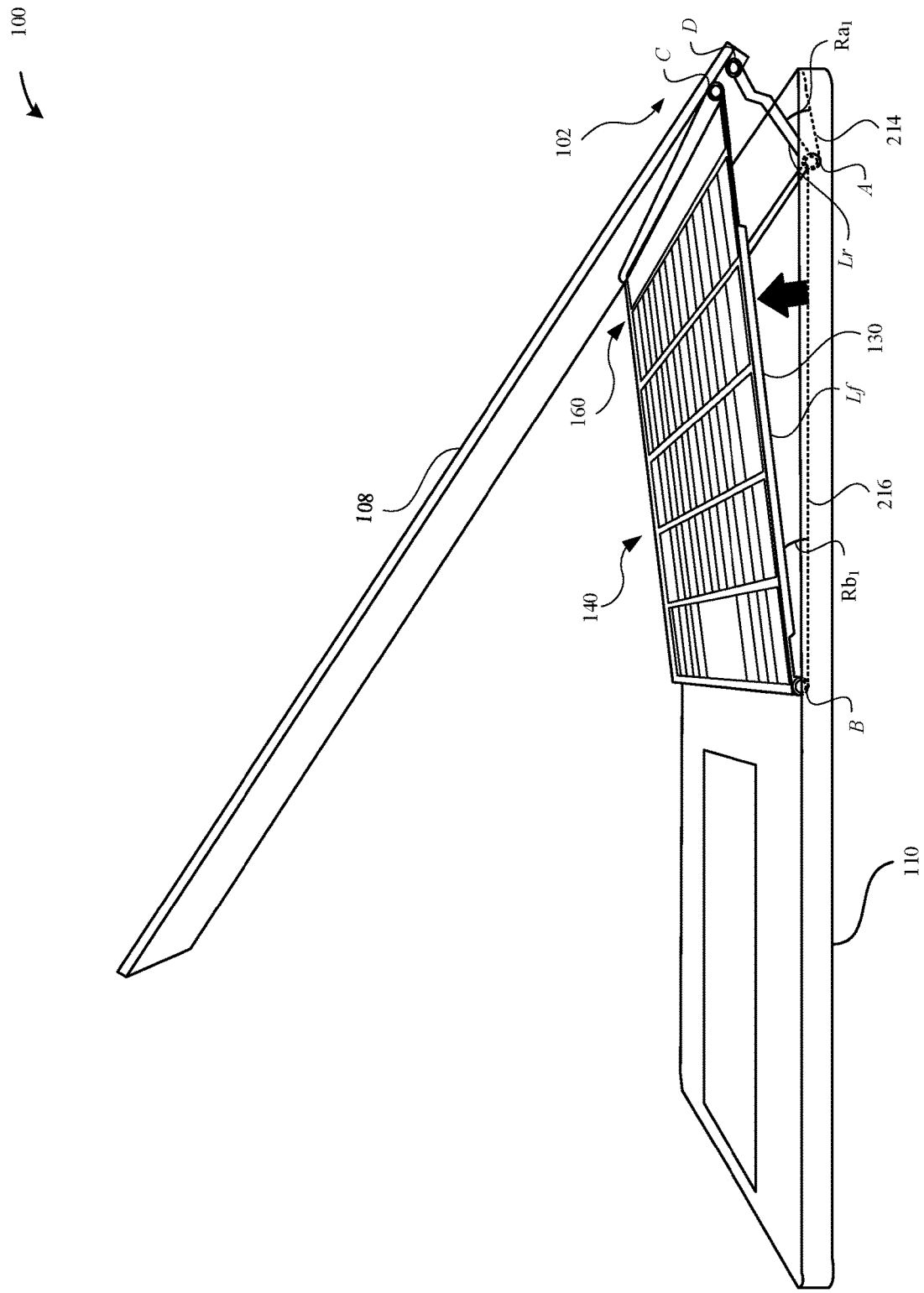

FIG. 2B illustrates the portable electronic device 100 in a reduced open configuration in accordance with some embodiments. According to some examples, the reduced open configuration corresponds to a display angle between the lid and base portions 108, 110 that is less than 90° and greater than 1°. As illustrated in FIG. 2B, the linkage assembly 102 is exposed along a back wall of the enclosure while in the reduced open configuration. In transitioning from the closed configuration to the reduced open configuration, keycaps of the keyboard 140 may become raised from the chassis 130. The keycaps can be concealed within the thickness of the chassis 130 to reduce the overall thickness (e.g., Z-axis) of the portable electronic device 100. Furthermore, in transitioning from the closed configuration to the reduced open configuration, the linkage assembly 102 is exposed and expanded as the third link ($L_r$) and the first link ($L_f$) oscillate. According to some examples, the dynamic multi-functional panel 160 and/or the speakers 180 may also be actuated to rise from the chassis 130. Beneficially, raising the speakers 180 can direct the speakers 180 towards the user for better audio transmission.

As illustrated in FIG. 2B, the first link ($L_f$) and the recessed surface 216 are set at an angle ($Rb_1$), while the third link ($L_r$) and the angled surface 214 are set at an angle ($Ra_1$). Furthermore, the distance between the joints C and D is decreased in the reduced open configuration relative to their corresponding distance in the closed configuration.

Figure 2C:
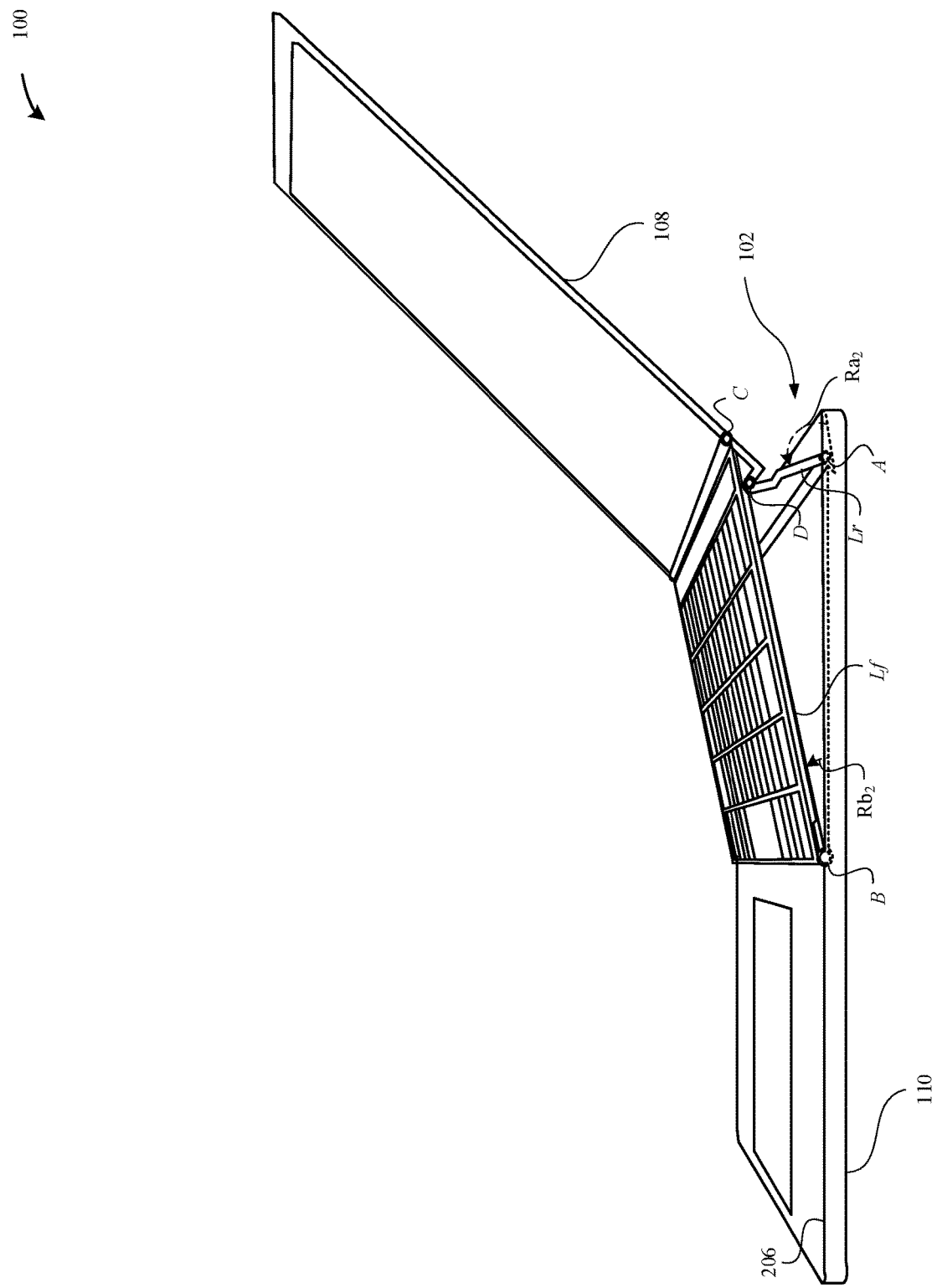

FIG. 2C illustrates a side view of the portable electronic device 100 in an expanded open configuration, in accordance with some embodiments. According to some examples, the expanded open configuration corresponds to a display angle between the lid and base portions 108, 110 that is greater than 90°. As illustrated in FIG. 2C, the first link ($L_f$) and the recessed surface 216 are separated by an angle ($Rb_2$), where $Rb_2 > Rb_1$, while the third link ($L_r$) and the angled surface 214 are separated by an angle ($Ra_2$), where $Ra_2 > Ra_1$.

As illustrated in FIG. 2C, the internal surface 206 may be in a different plane from the chassis 130. As a result, when the portable electronic device 100 is in the expanded open configuration, the base portion 110 remains static in position while the chassis 130 that includes the keyboard 140 is raised relative to the base portion 110. Beneficially, raising the keyboard 140 via the chassis 130 promotes a more ergonomic typing position for the user. The touchpad 150 remain static in position as the touchpad 150 is not coupled to the joint B of the first link ($L_f$).

Figure 2D:
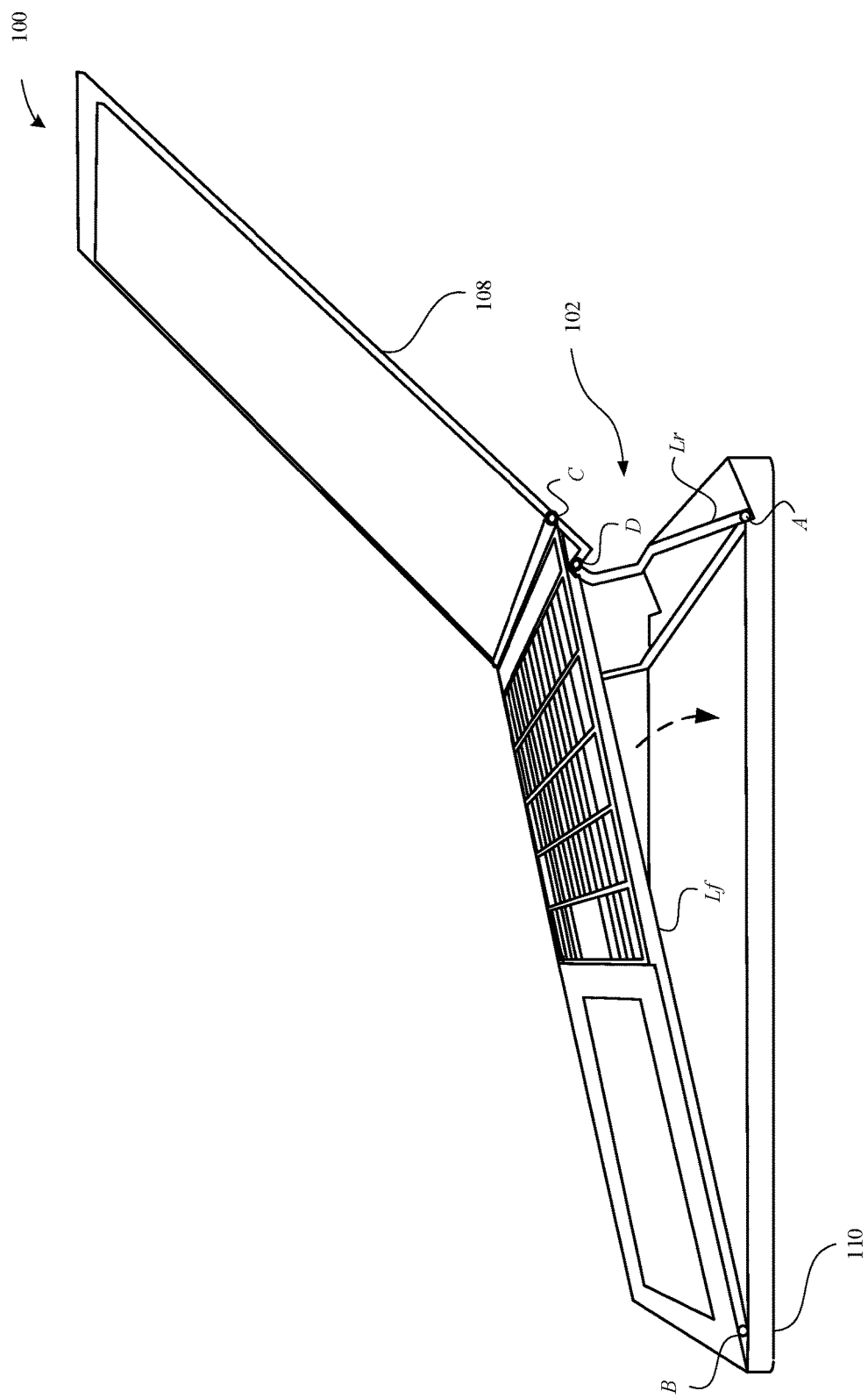

FIG. 2D illustrates a side view of the portable electronic device 100 in an expanded open configuration, in accordance with some embodiments. In contrast to the portable electronic device 100 shown in FIG. 2C, the chassis 130 includes the keyboard 140 and the touchpad 150. Both of the keyboard 140 and the touchpad 150 are coupled to the first link ($L_f$). As a result, the internal surface 206 of the base portion 110 may be in the same plane (i.e., coplanar) as the chassis 130 such as to impart a continuous look to the portable electronic device 100. To achieve the continuous look, the base portion 110 is coupled to the linkage assembly 102 and moves with the chassis 130. In some embodiments, the base portion 110 may function similar to deployable feet for the portable electronic device 100 to rest against a surface of a table. As a result, the entire chassis 130 may be lifted from the surface of the table at an angle greater than zero degrees.

Traditionally, a conventional hinge assembly generally requires a large cutout or notch between a display lid and base portion. The cutout would be necessary to accommodate for the sweep mechanism of the display lid. In particular, conventional laptops may require a minimum amount of clearance distance for the hinge to accommodate for the sweep clearance of the display lid when the display lid transitions from an open configuration to a closed configuration. However, accommodating for this minimum amount of clearance distance requires that the laptop have a minimum thickness. Consequently, the need to accommodate for sweep clearance is in opposition to the purpose of minimizing the thickness of the laptop. Moreover, in conventional laptops, the center of rotation sweeps back into the system. Beneficially, the portable electronic device 100 utilizes a linkage assembly 102 instead of a hinge mechanism, thereby negating the requirement for a notch so as to accommodate a minimum amount of sweep clearance.

Figure 2E:
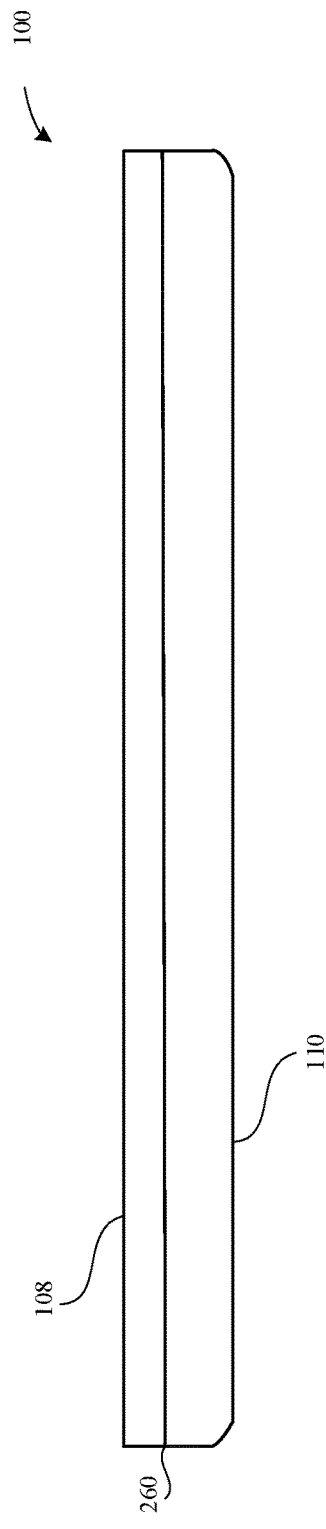
Figure 2F:
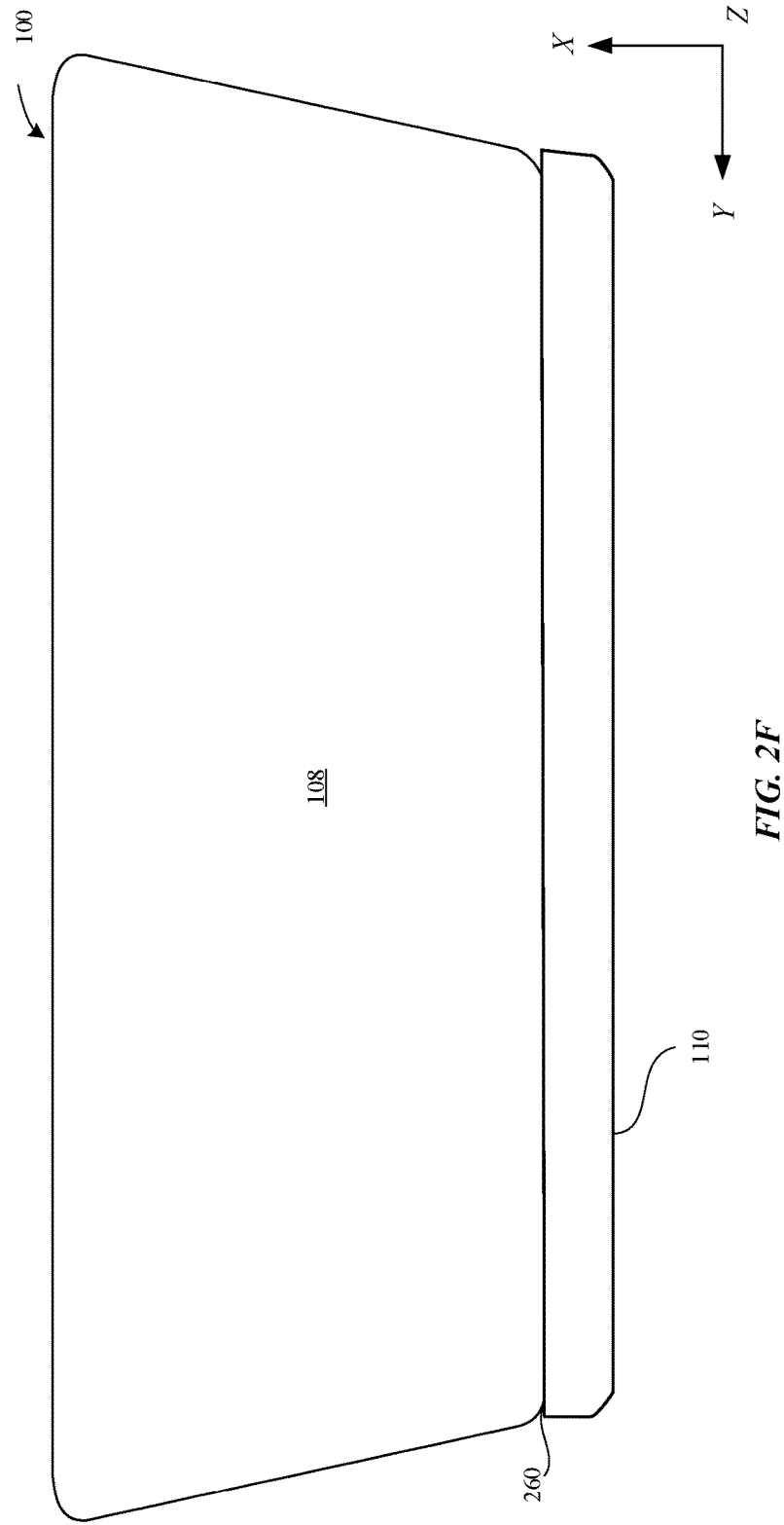

As illustrated in FIGS. 2E-2F, the enclosure of the portable electronic device 100 does not include a notch or cutout between the base portion 110 and the lid portion 108. Instead the enclosure includes a single seam 260 between the base portion 110 and the lid portion 108. FIG. 2E illustrates a rear view of a back wall of the enclosure of the portable electronic device 100 in the closed configuration. As shown in FIG. 2E, the linkage assembly 102 is contained entirely within a cavity of the base portion 110. Therefore, when the portable electronic device 100 transitions into the closed configuration, the linkage assembly 102 collapses into itself; thereby, negating the need for a minimum amount of sweep clearance. Moreover, the single seam 260 imparts the enclosure with more of a continuous, uninterrupted appearance between the lid and base portions 108, 110.

FIG. 2F illustrates the rear view of the back wall of the enclosure of the portable electronic device 100 in an open configuration. While in the open configuration, the center of rotation for the lid portion 108 is outside of the portable electronic device 100. As illustrated in FIG. 2F, there is no notch or cutout caused by rotating the lid portion 108 relative to the base portion 110.

Figure 2G:
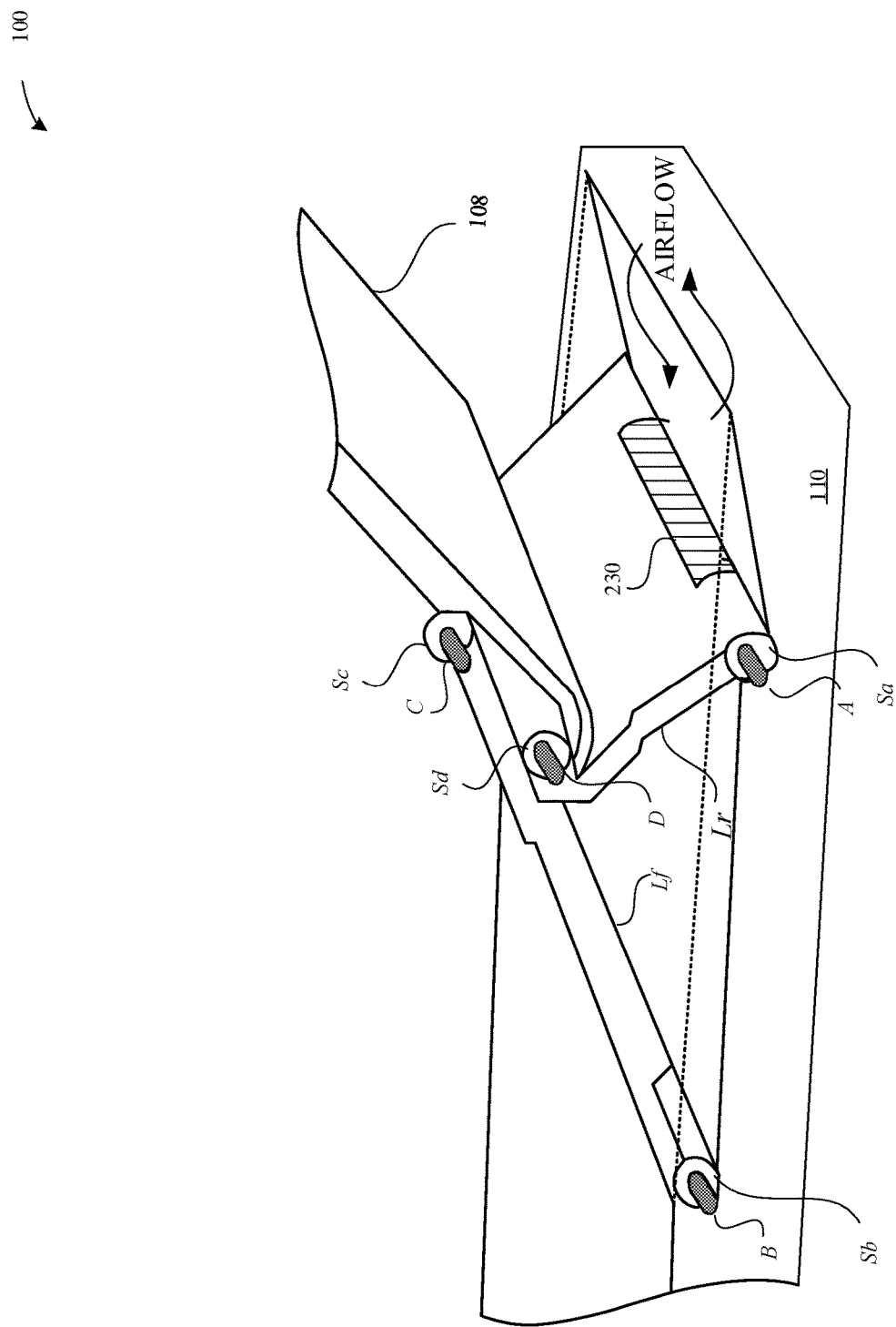

FIG. 2G illustrates an exemplary rear view of a back wall of the enclosure of the portable electronic device 100 in the expanded open configuration, in accordance with some embodiments. The third link ($L_r$) of the linkage assembly 102 may include cooling vents 230. When the third link ($L_r$) is raised from the base portion 110, the cooling vents 230 may become revealed and exposed. In contrast, while the portable electronic device 100 is in the closed configuration, the cooling vents 230 are not exposed due to being covered by the lid portion 108. The cooling vents 230 enable greater airflow to pass in/out of the internal system to promote more cooling of internal components (e.g., main logic board, battery, antenna, etc.).

Additionally, the cooling vents 230 represent an RF-transparent window that enables wireless signals to more effectively pass through. For example, the walls of the enclosure of the portable electronic device 100 may be formed of RF-opaque material (e.g., aluminum, stainless steel, etc.). However, the use of RF-opaque material may cause electromagnetic interference as well as increase the amount of parasitic capacitance between the enclosure and the wireless transceiver or antenna. Raising the third link ($L_r$) to expose the cooling vents 230 permits for electromagnetic waves to more easily pass through the enclosure such as to improve wireless signal performance. Furthermore, concealing the cooling vents 230 while the portable electronic device 100 is in the closed configuration can prevent debris and contaminants from entering the system via the cooling vents 230.

As illustrated in FIG. 2G, the first link ($L_f$) is either in-plane with the lid portion 108 or slightly proud of the lid portion 108. This is beneficial in that when the lid portion 108 is lowered relative to the base portion 110, the linkage assembly 102 does not crash. FIG. 2G illustrates that the joints A, B, C, D are set with hinges, where sleeves Sa, Sb, Sc, and Sd are mechanical bearings that enable the joints A, B, C, D, respectively, to rotate therein.

Figure 2H:
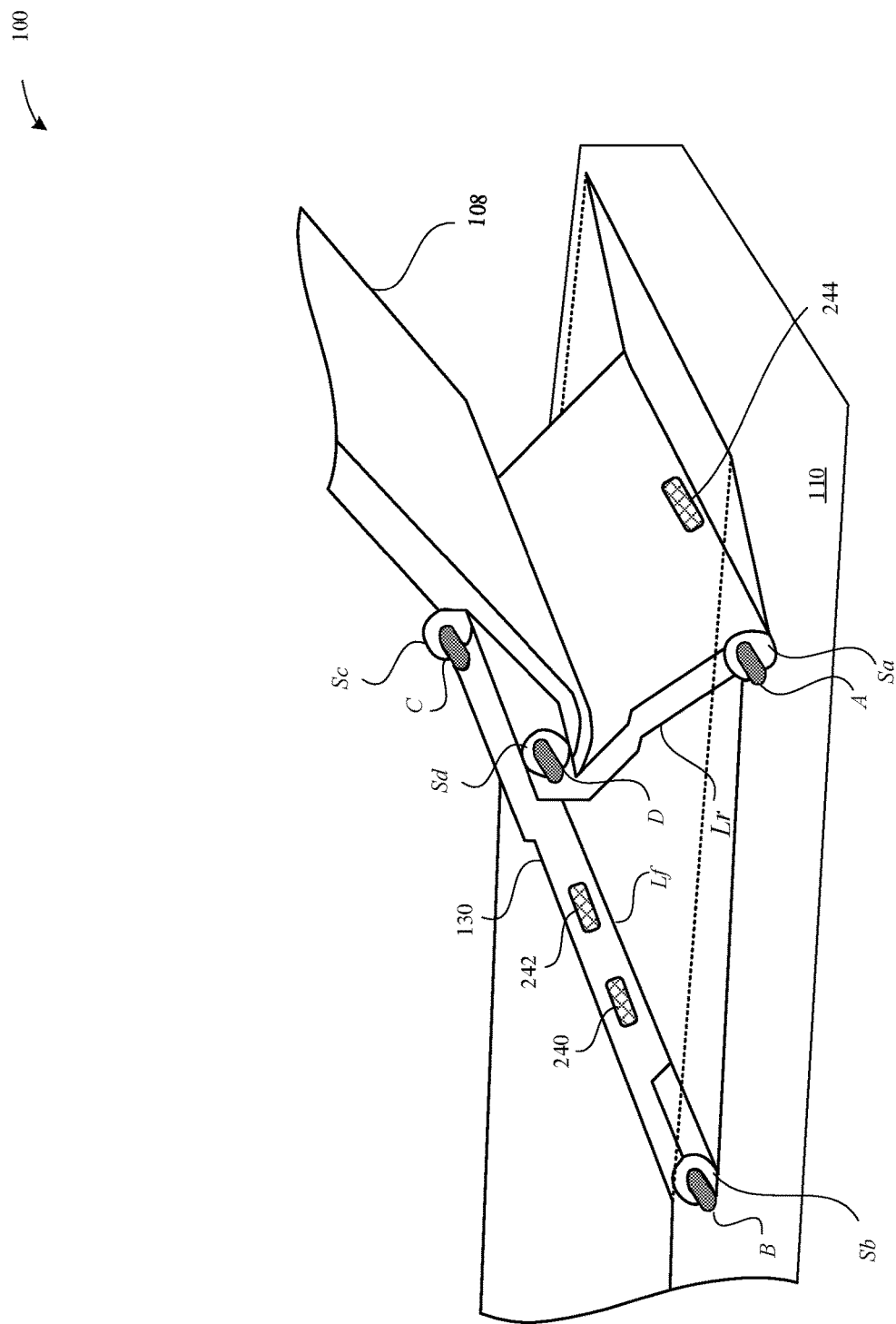

FIG. 2H illustrates an exemplary rear view of a back wall of the enclosure of the portable electronic device 100 in the expanded open configuration, in accordance with some embodiments. The chassis 130 may include I/O ports 240, 242, and 244. The I/O ports 240, 242, and 244 are concealed while the portable electronic device 100 is in the closed configuration. When the third link ($L_r$) is raised from the base portion 110, the I/O ports 240, 242, and 244 may become revealed and exposed. The I/O ports 240, 242, and 244 enable for a variety of external peripherals (e.g., external hard drives, monitors, etc.) to be electronically coupled to a processor of the portable electronic device 100. The I/O ports 240, 242, and 244 may include USB-C ports, HDMI ports, Ethernet ports, and the like. Furthermore, concealing the I/O ports 240, 242, and 244 while the portable electronic device 100 is in the closed configuration can prevent debris and contaminants from entering the system via the I/O ports 240, 242, and 244. In some embodiments, the portable electronic device 100 may include a fabric covering or bellows to conceal the linkage assembly 102 from exposure to external debris and contaminants. The fabric covering is capable of expanding or contracting in response to deploying the portable electronic device 100 towards the open configuration and the closed configuration, respectively.

Figure 3A:
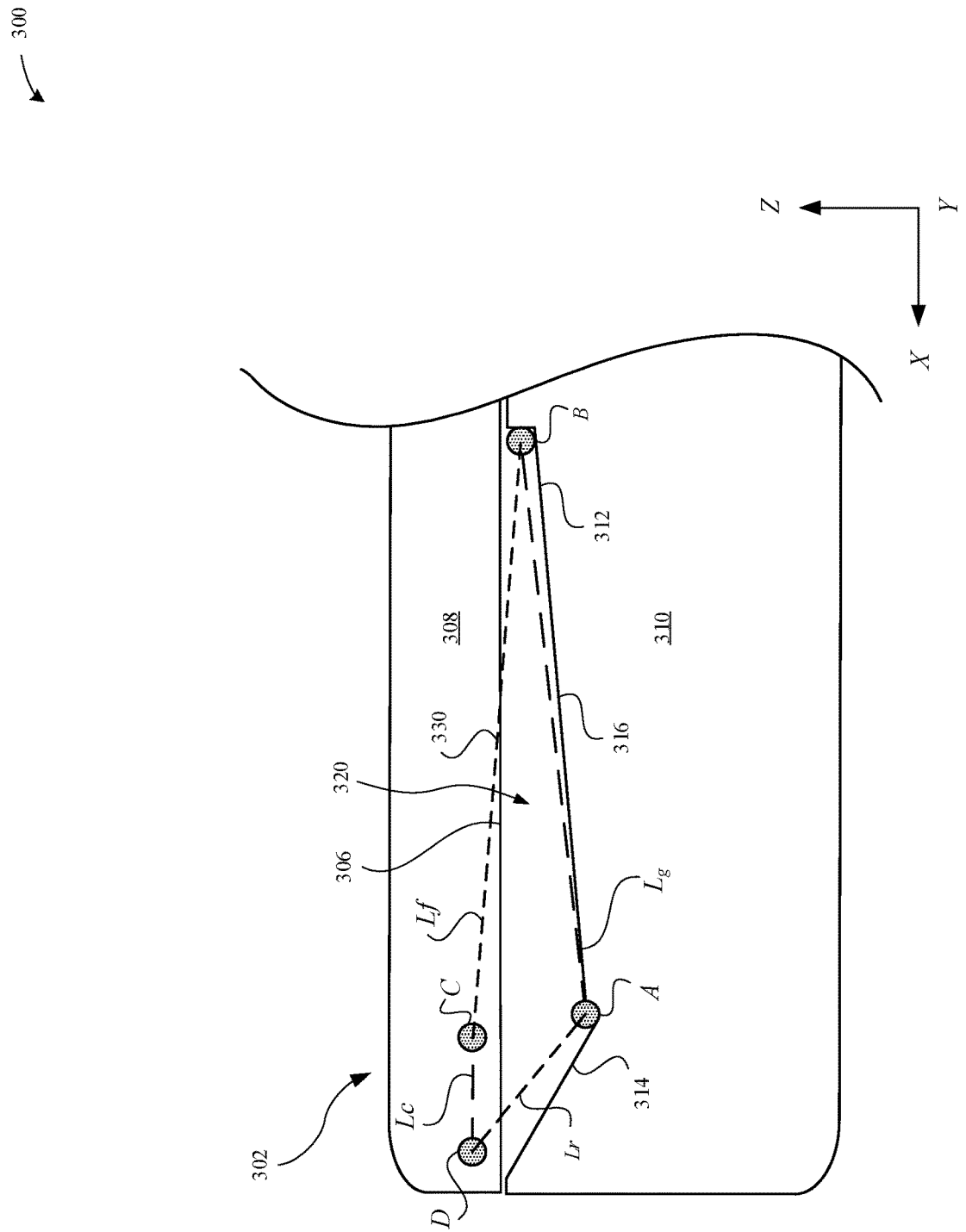
FIGS. 3A-3C illustrate side views of a portable electronic device that includes a linkage assembly while the portable electronic device transitions between a closed configuration and an open configuration, in accordance with some embodiments.
Figure 3B:
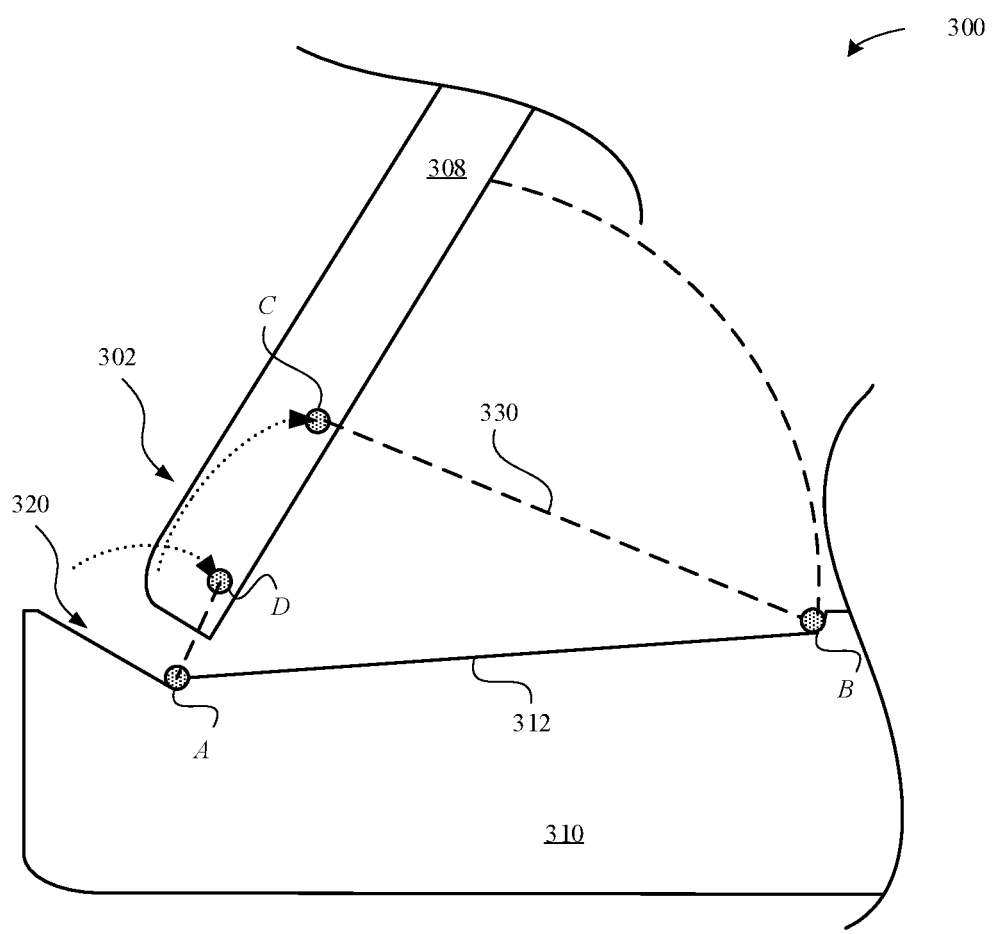
Figure 3C:
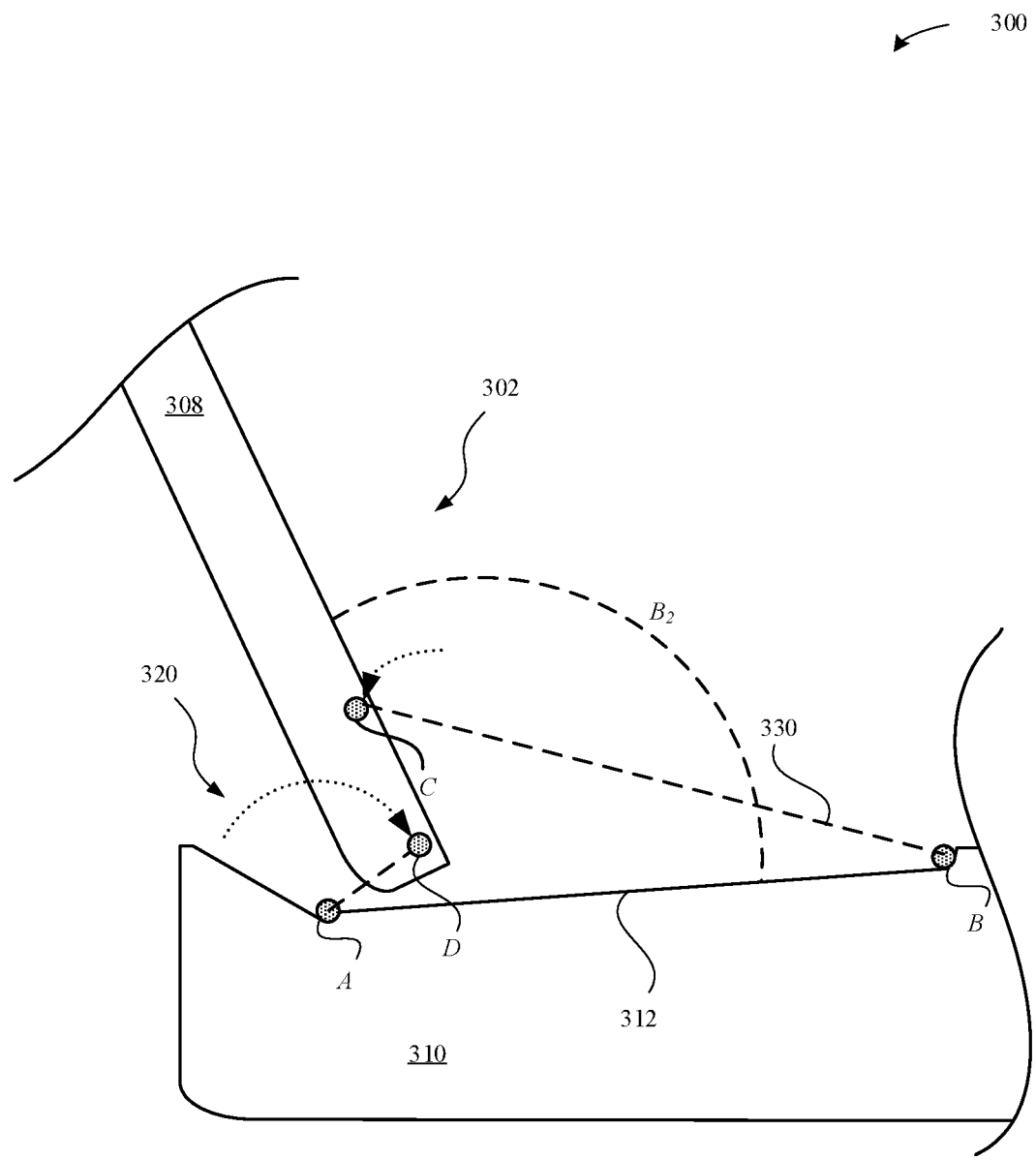

FIGS. 3A-3C illustrate simplified side views of a portable electronic device that includes a linkage assembly, in accordance with some embodiments. In particular, the simplified side views illustrate the mechanics of a linkage assembly 302 of a portable electronic device 300 while transitioning between the open configuration and the closed configuration.

FIG. 3A illustrates the portable electronic device 300 in a closed configuration. As illustrated in FIG. 3A, an internal surface 306 of the lid portion 308 is generally parallel to an internal surface 312 of the base portion 310. In the closed configuration, there is limited access and/or visibility to the linkage assembly 302 that is carried within a linkage assembly—receiving feature 320. the linkage assembly 302 includes links $L_g$, $L_f$, $L_c$, and $L_r$. these links may be fixed throughout the transition of the portable electronic device 300 between the open and closed configurations. In some embodiments, the length of any one of these links ($L_g$, $L_f$, $L_c$, $L_r$) may be adjusted in length throughout the transition of the portable electronic device 300 between the open and closed configurations such as to provide for fine-tuning of the viewing angle (e.g., acute angle adjustments, etc.). The linkage assembly 302 includes a number of joints A, B, C, D that are coupled to different components of the portable electronic device. By way of example, FIG. 3A illustrates that the joint A is coupled to a distal portion of the base portion 310, such as an angled surface 314 of a linkage assembly—receiving feature 320 and the joint B is coupled to a recessed surface 316 of a proximal portion of the linkage assembly—receiving feature 320. In particular, the linkage assembly—receiving feature 320 has a size and shape that permits for a proximal portion of the lid portion 108 to rotate within a cavity of the linkage assembly—receiving feature 320 while the portable electronic device 300 transitions from a closed state to an open state. FIG. 3A further illustrates that the joint C is coupled to a proximal portion of the lid 108 and the joint D is coupled to a distal portion of the lid 308. FIG. 3A illustrates that the joints A, B may be non-coplanar to each other; however, the joints A, B may also be co-planar to each other.

According to some embodiments, the chassis 330 may correspond to the first link ($L_f$). As illustrated in FIG. 3A, the chassis 330 (i.e., the first link $L_f$) may be generally parallel to the base portion 310 such as to conceal the thickness of the chassis 330 within a cavity of the linkage assembly—receiving feature 320.

FIG. 3B illustrates the portable electronic device 300 in a reduced open configuration, in accordance with some embodiments. According to some examples, the reduced open configuration refers to a viewing angle ($B_1$) that is greater than one degree (1°) and less than 90 degrees (90°). An input motion is applied to the third link ($L_r$), thereby causing the third link ($L_r$) to oscillate in a proximal direction towards the first link ($L_f$). Furthermore, the oscillation of the third link ($L_r$) drives the first link ($L_f$) to move in a proximal direction. As a result, the position of the joints C, D is raised relative to the internal surface 312.

FIG. 3C illustrates the portable electronic device 300 in an expanded open configuration. According to some examples, the expanded open configuration refers to a viewing angle ($B_2$) that is greater than 90 degrees (90°), where $B_2 > B_1$. As illustrated in FIG. 3C, the input motion is further applied to the third link ($L_r$) causing the third link ($L_r$) to oscillate further in the proximal direction which drives the first link ($L_f$). The first link ($L_f$) is inverted over the third link ($L_r$) as the first link ($L_f$) moves in the distal direction. The first link ($L_f$) and the third link ($L_r$) have axes that are angled such that the links ($L_f$, $L_r$) are capable of overlapping each other.

Figure 5:
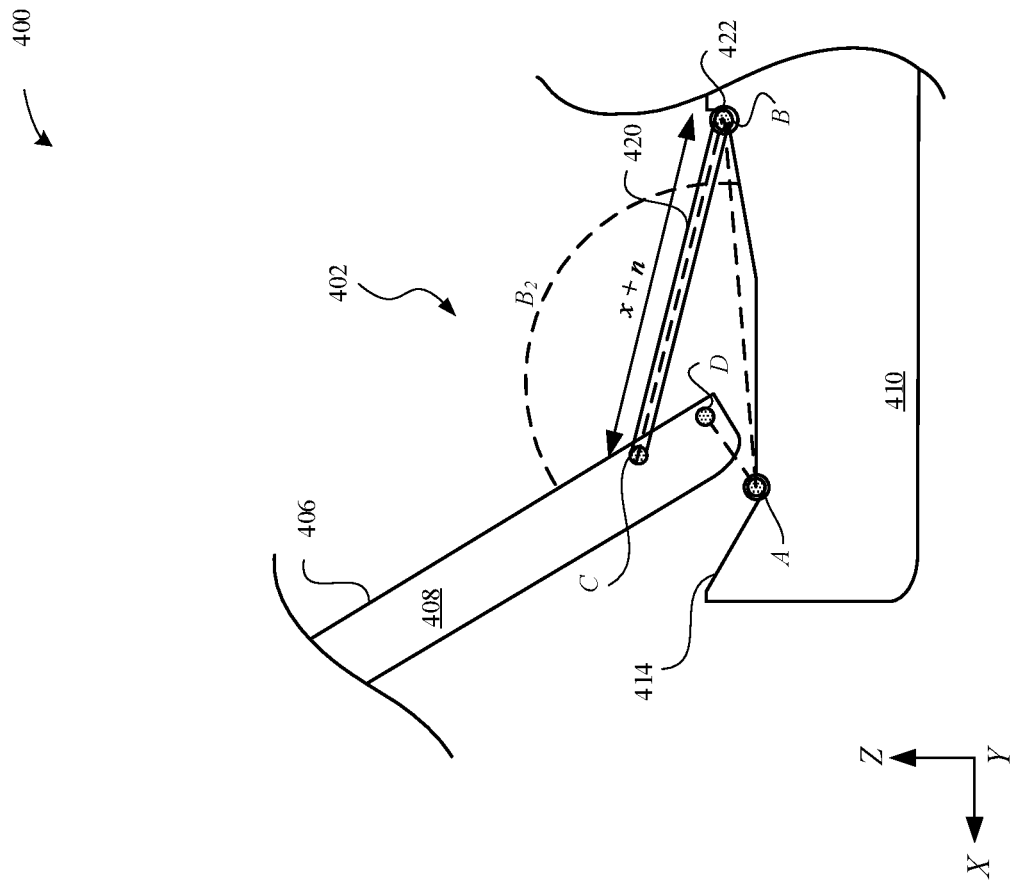
FIGS. 4-5 illustrate side views of a portable electronic device that includes a linkage assembly and a translating mechanism, in accordance with some embodiments.
Figure 4:
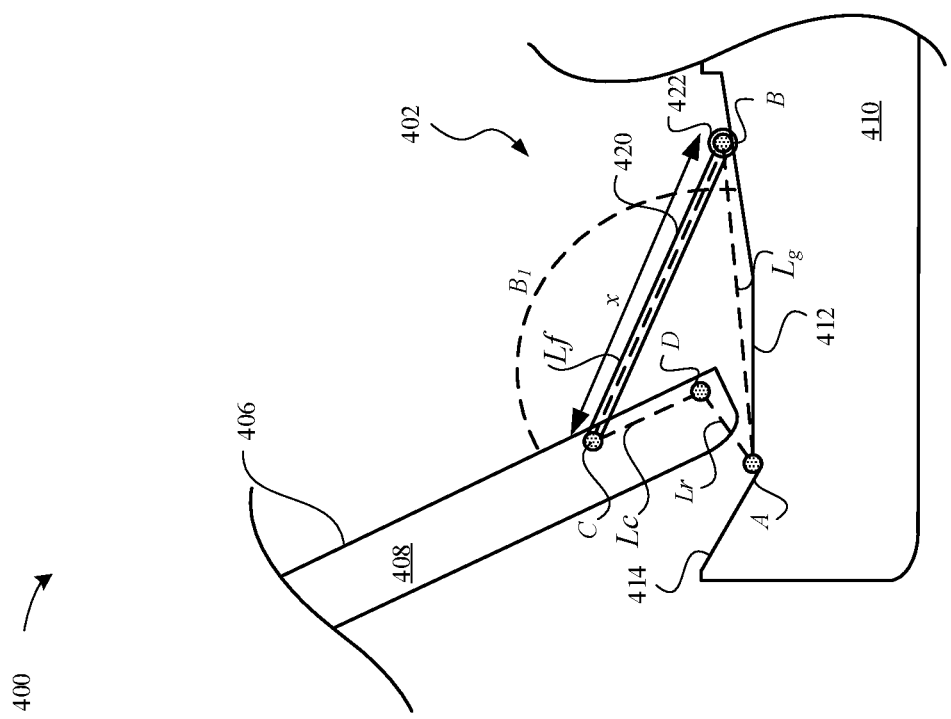

FIGS. 4-5 illustrate simplified side views of a portable electronic device that includes a linkage assembly, in accordance with some embodiments. In particular, the simplified side views illustrate the mechanics of a linkage assembly 402 of a portable electronic device 400 while transitioning between the open configuration and the closed configuration. As illustrated in FIG. 4, an internal surface 406 of the lid portion 408 is set at a display angle ($B_1$) from an internal surface 412 of the base portion 410. The portable electronic device 400 is illustrated in an expanded open configuration (e.g., the display angle $B_1$ greater than 90°, etc.). The linkage assembly 402 is capable of undergoing fine—tune adjustments to modify the display angle by adjusting a length of one or more of the links ($L_g$, $L_f$, $L_c$, $L_r$).

In order to deploy the portable electronic device 400 at the display angle ($B_1$), the third link ($L_r$) is oscillated away from an angled surface 414 of the base portion 410. Additionally, the oscillation of the third link ($L_r$) in the proximal direction causes the first link ($L_f$) to cross over the third link ($L_r$) in the distal direction. In other words, the angle ($Ra_1$) is an obtuse angle such as to enable the first link ($L_f$) to cross over the third link ($L_r$).

It should be noted that the length of the third link ($L_r$) is less than the length of the first link ($L_f$). Beneficially, this disparity in length extends the range of motion of the first link ($L_f$) when the third link ($L_r$) oscillates by preventing the first and third links ($L_f$, $L_r$) from becoming collinear to each other. This lack of collinearity prevents the linkage assembly 402 from locking up when additional input motion is applied at the third link ($L_r$).

FIG. 5 illustrates the portable electronic device 400 in an adjusted expanded open configuration, in accordance with some embodiments. The linkage assembly 402 includes a slider mechanism 420 that is capable of providing fine—tune adjustments to the display angle not generally possible using only the closed pivoting motion of the links ($L_g$, $L_f$, $L_c$, $L_r$). The slider mechanism 420 is capable of translating the linkage assembly 402 in a linear direction (e.g., along the X-axis). FIG. 5 illustrates that the slider mechanism 420 is coupled to the joints B, C. The user may provide fine—tune adjustments to the display angle using the slider mechanism 420. Using the slider mechanism 420, FIG. 5 illustrates that the lid and base portions 408, 410 are set apart by the display angle ($B_2$), where $B_2 > B_1$.

To fine-tune the user viewing angle, the slider mechanism 420 extends the distance between the joints B, C by distance (x+n). In other words, the length of the first link ($L_f$) is extended. In some examples, the range of linear motion is anywhere between about 0.1 mm to about 100 mm. The display 120 would rotate around joints A or D.

According to any one of the portable electronic device embodiments described herein, at least one of the joints A, B, C, or D may include a friction—inducing element 422. By incorporating at least one friction—inducing element 422 in at least one of the joints, the linkage assembly 402 can generate different user feel and perception, such as acceleration, rotation angle, and the like. The friction—inducing element 422 may be incorporated directly into the design of the joints. When utilized with the slider mechanism 420, the friction—inducing element 422 can hold the portable electronic device 400 at the prescribed display angle ($B_2$).

According to some embodiments, the linkage assembly 402 utilizes the friction—inducing element 422 in a two-stage adjustment. Firstly, the user may utilize the linkage assembly 402 to apply a rough adjustment to initially set the display angle (e.g., $B_1$). According to some embodiments, any one of the joints A, B, C, D may include a friction—inducing element 422 to hold the display angle (e.g., $B_1$) in place. Thereafter, the user may utilize the slider mechanism 420 to apply a fine adjustment to refine the rough display angle. It should be noted that the refined display angle (e.g., $B_2$) may not be attainable by solely using the rough adjustment. The slider mechanism 420 may adjust the length of one or more of the links ($L_g$, $L_f$, $L_c$, $L_r$). Thereafter, the linkage assembly 402 may utilize the friction—inducing element 422 to hold the refined display angle (e.g., $B_2$) in place. According to some embodiments, the friction—inducing element 422 to provide the rough adjustment may require a different amount of friction than the friction—inducing element 422 to provide the fine adjustment. For example, there may be a lower amount of friction required to initially deploy the rough display angle (e.g., $B_1$) and a higher amount of friction required to deploy the refined display angle (e.g., $B_2$).

It should be noted that in some embodiments, it may be more desirable to implement the slider mechanism 420 along the first link ($L_f$) instead of the third link ($L_r$) such that the display 120 can move forwards and backwards. Moreover, it is easier for the user to access the slider mechanism 420 along the first link ($L_f$).

According to some embodiments, multiple friction—inducing elements 422 can be implemented at the joints A, B, C, D according to a friction hierarchy. For example, incorporating increased amounts of friction at the joints B, C imparts the first link ($L_f$) with an increased amount of friction relative to the third link ($L_r$). In another example, the joints A, D may incorporate the friction—inducing element 422 such as to increase the amount of friction at the third link ($L_r$) relative to the first link ($L_f$) such that when the display angle is less than 45 degrees (45°), the lid portion 408 is more likely to stay open relative to the base portion 410, and when the display angle ($B_2$) is greater than 45 degrees (45°), the lid portion 408 is easier to close relative to the base portion 410. In some examples, the friction—inducing element 422 is a detent, a magnet, a fastener, a fluid, or a sleeve (e.g., rubber, etc.), and the like. Where the friction—inducing element 422 is a magnet, an amount of force may be required by the user to the joint (e.g., joint B) from the magnet.

Beneficially, incorporating the friction—inducing element 422 in at least one of the joints provides better design flexibility with respect to inducing a certain amount of friction throughout the linkage assembly 402. Additionally, the use of multiple friction—inducing elements 422 can collectively impart the linkage assembly 402 with the requisite amount of friction required to hold the display angle while also reducing the thickness of the portable electronic device 400 because the source of the friction is de-localized instead of focused in a centralized location. Indeed, one of ordinary skill in the art would understand that conventional laptops require a minimum diameter of a clutch shaft to induce a predetermined amount of friction. In other words, the amount of friction that is capable of being induced is proportional to the diameter of the clutch. However, this direct proportional relationship is at odds with the design theme of maintaining the portability of a laptop and reducing the thickness of the laptop.

FIGS. 6A-6G illustrate various perspective views of a portable electronic device that includes a linkage assembly, where the portable electronic device is capable of transitioning between a closed configuration and an open configuration, in accordance with some embodiments.

Figures 6A, 6B:
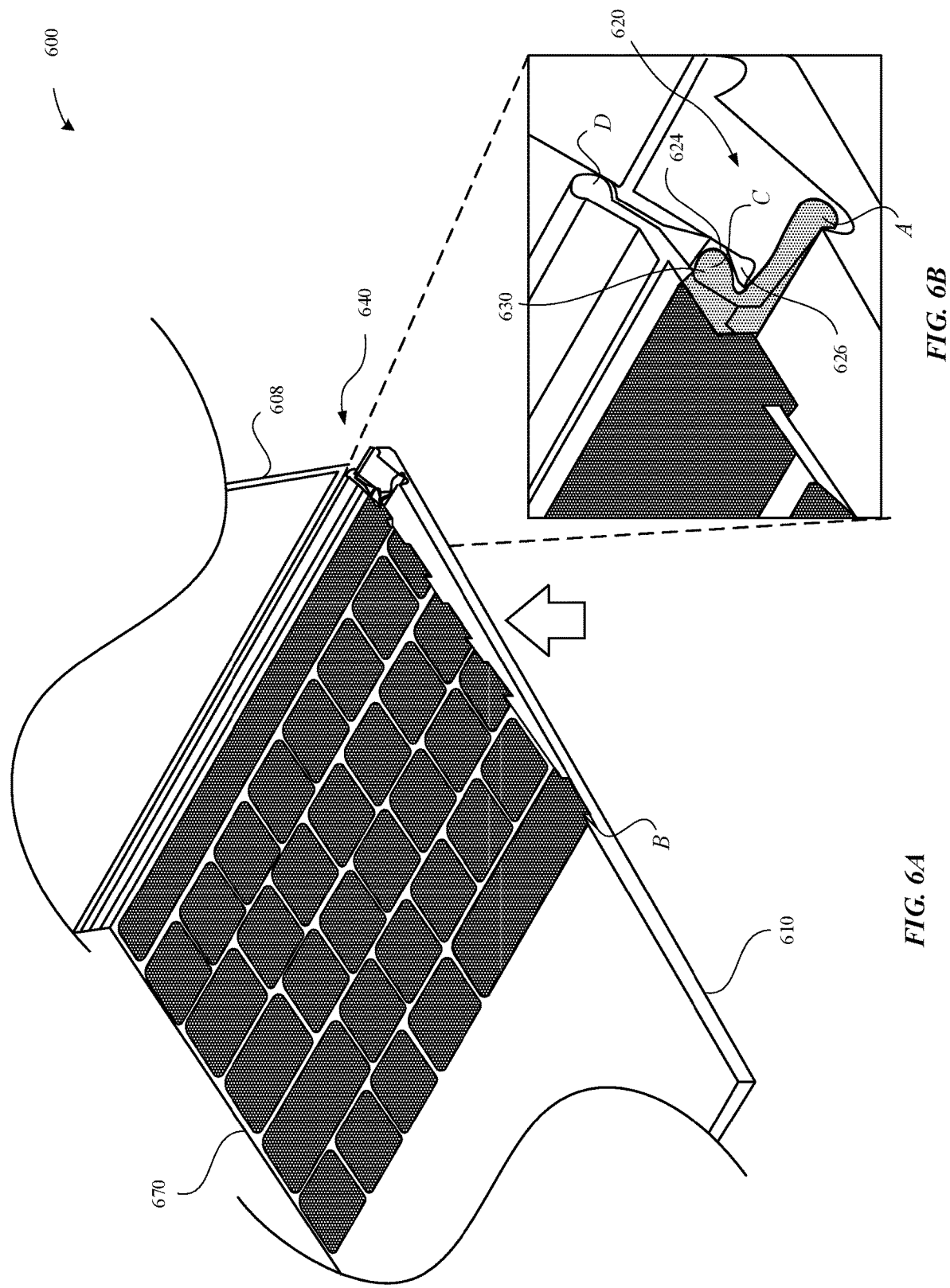

FIG. 6A illustrates a perspective cross-sectional view of a portable electronic device 600 in an open configuration as taken along a midline, in accordance with some embodiments. In the open configuration, the angle between the lid and base portions 608, 610 may be between one degree (1°) and 90 degrees (90°). In contrast to the linkage assembly 402 of the portable electronic device 400, the portable electronic device 600 includes a linkage assembly 640 having joint(s) with a curved interface 630. Beneficially, curved interface 630 imparts the chassis 670 with a lack of a protruding hinge such as to provide a more continuous look with the display of the lid portion 608. Furthermore, FIG. 6A illustrates that the chassis 670 is characterized as lacking a border such as to further facilitate the more continuous look.

The linkage assembly 640 includes a fabric hinge (also referred to as a Jacob's ladder hinge) that includes a material 624, such as a friction—inducing material that imparts friction on the joint C sufficient to hold the display angle. The material 624 borders a curved interface 630 along the joint C. When the lid portion 608 rotates relative to the base portion 610, the material 624 rolls along the curved interface of the joint C. Instead of implementing the friction—inducing element 422 at the joint, the linkage assembly 640 can utilize the material 624 to impart friction on the curved interface 630.

FIG. 6B illustrates a magnified view of the linkage assembly 640, in accordance with some embodiments. The linkage assembly 640 includes joints A, B, C, and D. The joint C includes a curved interface 630. The joint D includes a rolling interface 626. The joint C may be carried within a cavity of the linkage assembly—receiving feature 620 of the base portion 610 when the portable electronic device 600 is in the closed configuration. When an input motion is applied to the lid portion 608, a rolling interface 626 of the lid portion 608 rolls against the curved interface 630 of the joint C. Both of the rolling interface 626 and the curved interface 630 may include separate sheets of the material 624, as will be described in greater detail with respect to FIG. 6E. The separate sheets of the material 624 enable the curved interface 630 to roll against the rolling interface 626 while also imparting an amount friction.

Figures 6C, 6D:
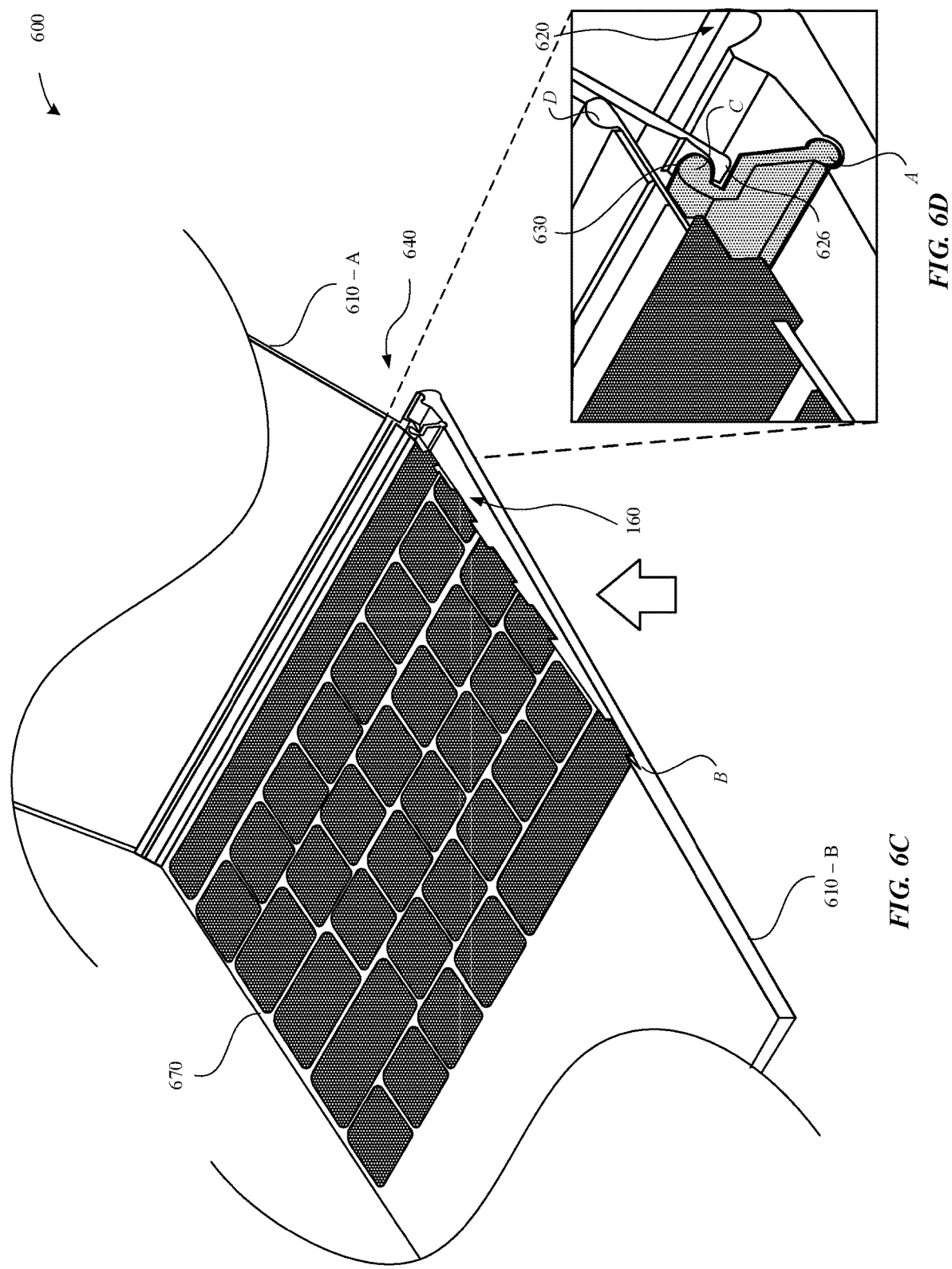

FIGS. 6C-6D illustrate various perspective views of the portable electronic device 600 while in an expanded open configuration, in accordance with some embodiments. In the expanded open configuration, the angle between the lid and base portions 608, 610 may be greater than 90 degrees (90°). FIG. 6C illustrates a perspective cross-sectional view of the portable electronic device 600 in the expanded open configuration as taken along a midline, in accordance with some embodiments. FIG. 6D illustrates a magnified view of the linkage assembly 640 while the portable electronic device 600 is in the expanded open configuration, in accordance with some embodiments. The linkage assembly 640 includes joints A, B, C, and D that are capable of raising the chassis 670 from the base portion 610 when transitioning to the expanded open configuration.

Figure 6E:
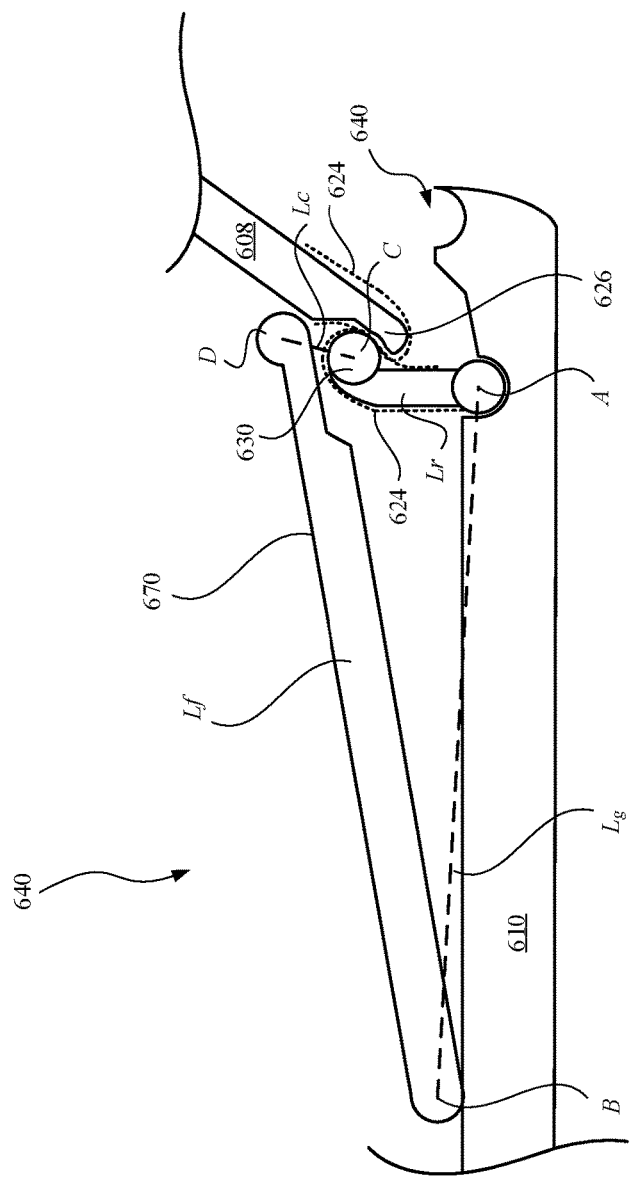

FIG. 6E illustrates a side view of the portable electronic device 600 that includes the linkage assembly 640, in accordance with some embodiments. Instead of implementing a hinge assembly, the linkage assembly 640 includes a joint C having a curved interface 630. The curved interface 630 is capable of rolling against the rolling interface 626 of the lid portion 608. A sheet of material 624 may overlay each of the rolling interface 626 and the curved interface 630. These sheets of material 624 may roll against each other when the portable electronic device 600 transitions between the closed and open configurations. As shown in FIG. 6E, the chassis 670 is raised relative to the base portion 610.

FIG. 6E illustrates that the linkage assembly 640 includes joints A, B, C, D. The joints B, D define a first link ($L_f$), the joints A, B define a second link ($L_g$), the joints A, C define a third link ($L_r$), and the joints C, D define a fourth link ($L_c$). In some examples, when an input motion is applied to the chassis 670, the chassis 670 may be raised and/or lowered relative to the base portion 610.

FIGS. 6F-6G illustrate simplified side views of the portable electronic device 600 that includes the linkage assembly 640, in accordance with some embodiments. In particular, the simplified side views illustrate the mechanics of the linkage assembly 640 of a portable electronic device 600 while transitioning between the closed and open configuration. FIG. 6G illustrates the portable electronic device 600 while in the closed configuration. As illustrated in FIG. 6F, an internal surface of the base portion 610 is generally parallel to an internal surface of the lid portion 608.

FIG. 6G illustrates the portable electronic device 600 while in the open configuration. The chassis 670 may include the keyboard MO. By utilizing the rolling interface 626, the keyboard 140 may rise above a distal portion of the lid portion 608. FIG. 6G illustrates that the curved interface 630 rolls above the rolling interface 626. Furthermore, the rolling interface 626 also pushes the chassis 670 away from the lid portion 608. Beneficially, this may cause the keyboard 140 to appear to float over the display 120 of the lid portion 608. The separate sets of material 624 that overlay each of the rolling interface 626 and the curved interface 630 may be referred to as a hinge having a zero diameter.

Figure 7A:
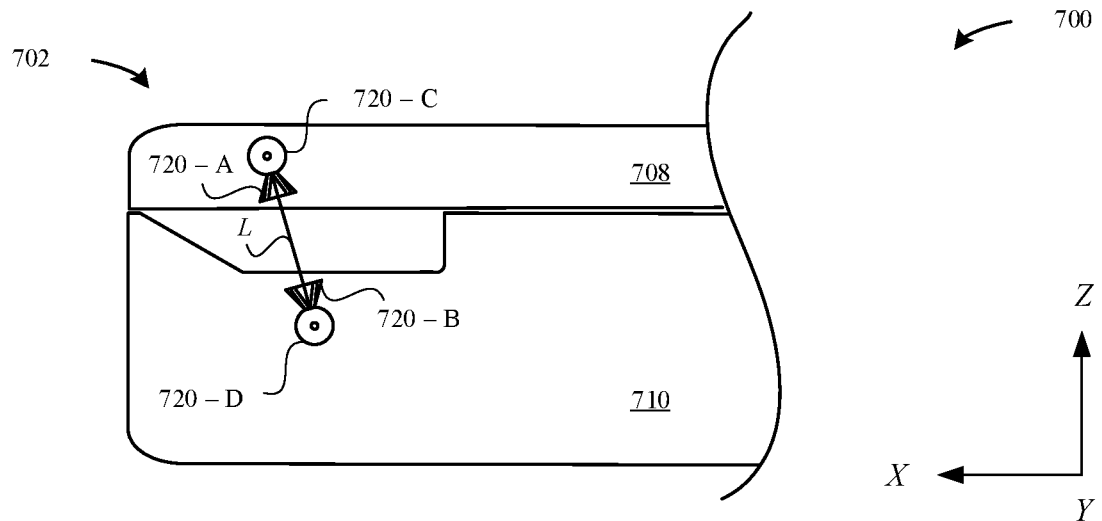
FIGS. 7A-7C illustrate side views and a cross-sectional view of a portable electronic device that includes a linkage assembly, in accordance with some embodiments.
Figure 7B:
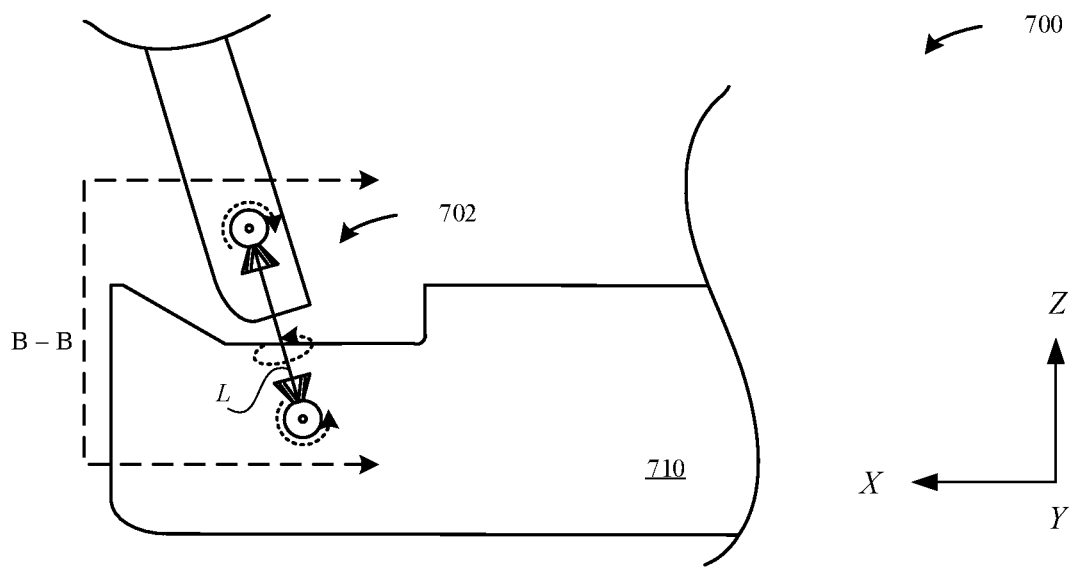
Figure 7C:
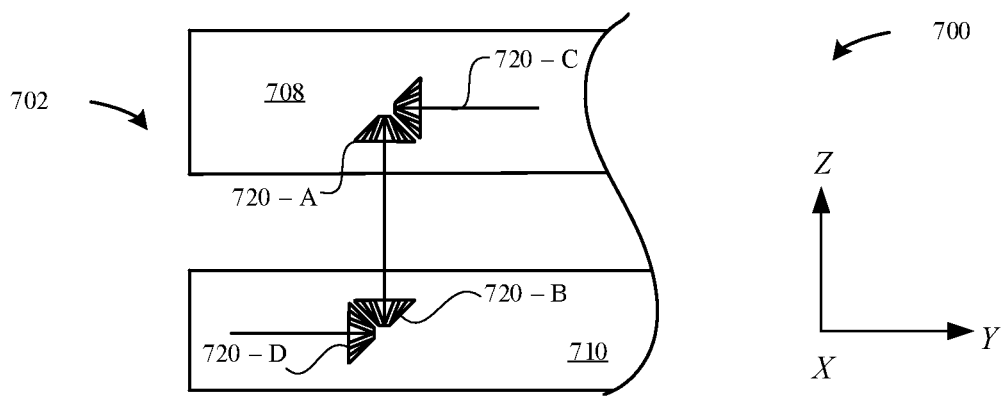

FIGS. 7A-7C illustrate various views of a portable electronic device that includes a linkage assembly, where the portable electronic device is capable of transitioning between a closed configuration and an open configuration, in accordance with some embodiments. FIG. 7A illustrates the portable electronic device 700 in a closed configuration. The portable electronic device 700 includes a linkage assembly 702 that includes a single linkage (L) in contrast to the multiple links of the linkage assemblies some of the other embodiments described herein. The linkage (L) of the linkage assembly 702 is coupled to the lid portion 708 and the base portion 710.

FIG. 7B illustrates the portable electronic device 700 in an open configuration, in accordance with some embodiments. In particular, a first end of the link (L) is defined by a first gear 720-A and a second end of the link (L) is defined by a second gear 720-B. In some embodiments, teeth of the first gear 720-A is capable of interacting with teeth of a third gear 720-C in an orthogonal orientation such as to transfer rotary motion between the Z-axis and the Y-axis of the linkage assembly 702. Additionally, the rotary motion of the first gear 720-A is also capable of causing the second gear 720-B to rotate in the Z-axis and transfer the rotary motion to a fourth gear 720-D along the Y-axis. As the third and fourth gears 720-C, D are disposed in opposite directions, these gears will rotate in opposite directions.

FIG. 7C illustrates a cross-sectional view of the portable electronic device 700 in the open configuration as taken along the reference line B-B. In some examples, each of the gears 720-A, B, C, D may have different ratios in order to compensate for their respective differences in rotation. Beneficially, the linkage assembly 702 is capable of enabling the portable electronic device 700 to transition between closed and open configurations while significantly reducing the number of links relative to other linkage assemblies.

Figure 8B:
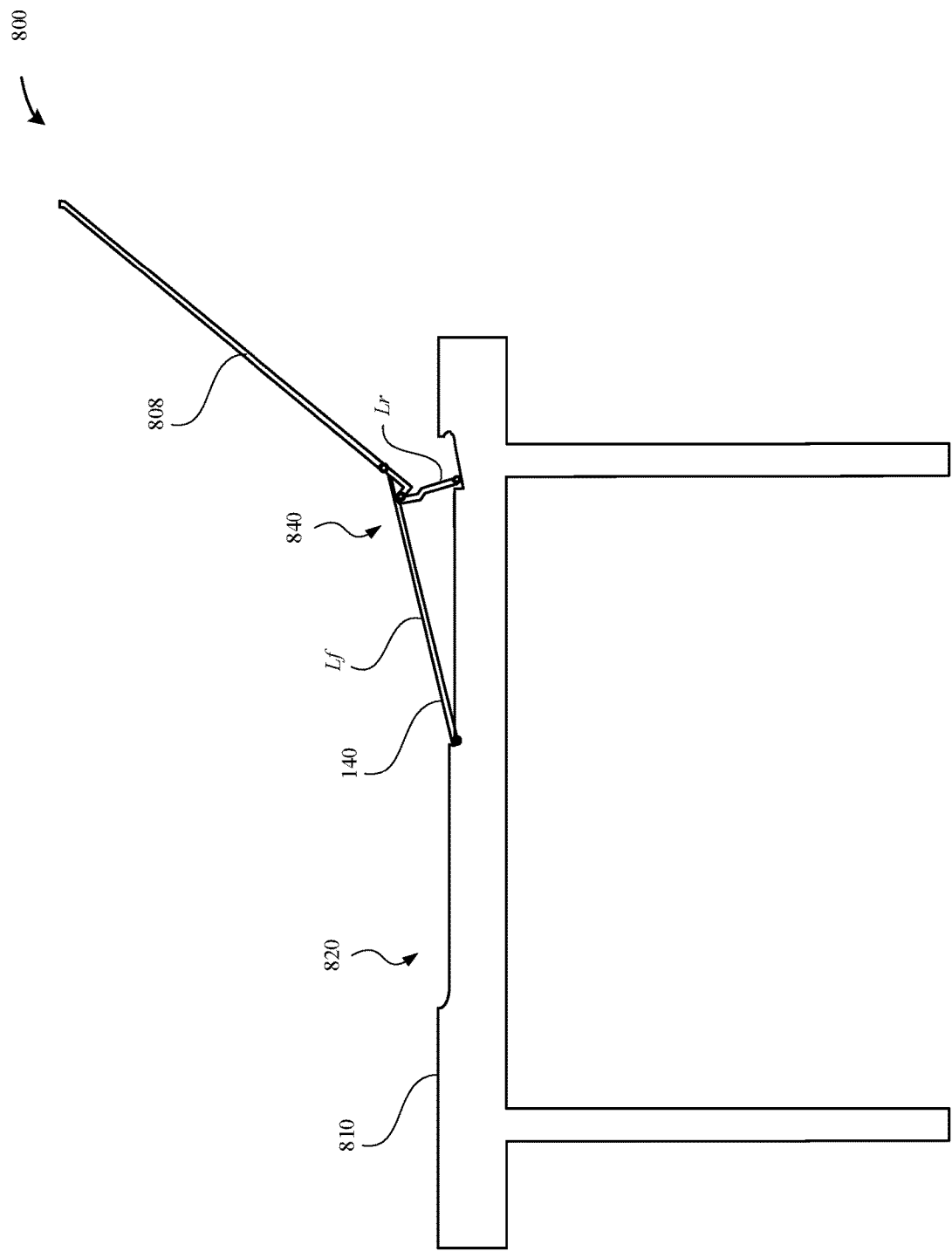

FIGS. 8A-8B illustrate side views of a desk that includes a portable electronic device having a linkage assembly that is integrated into the desk, in accordance with some embodiments. FIG. 8A illustrates the desk 800 in a closed configuration, where a linkage assembly 840 is generally concealed by a lid portion 808 such that the linkage assembly 840 is not viewable. In some embodiments, the lid portion 808 may also define a surface of the desk. In some examples, the desk 800 includes a linkage assembly—receiving feature 820 that includes a cavity that carries the linkage assembly 840. The linkage assembly includes a third link ($L_r$) and a first link ($L_f$). The desk 800 includes a lid portion 808 that is capable of pivoting relative to a base portion 810. FIG. 8B illustrates the desk 800 in an open configuration, where the linkage assembly 840 is exposed and is raised such as to elevate a keyboard 140 or other operational component relative to the base portion 810. The linkage assembly described herein may also be incorporated into cases, folios, sleeves, accessories, and furniture.

Figure 9:
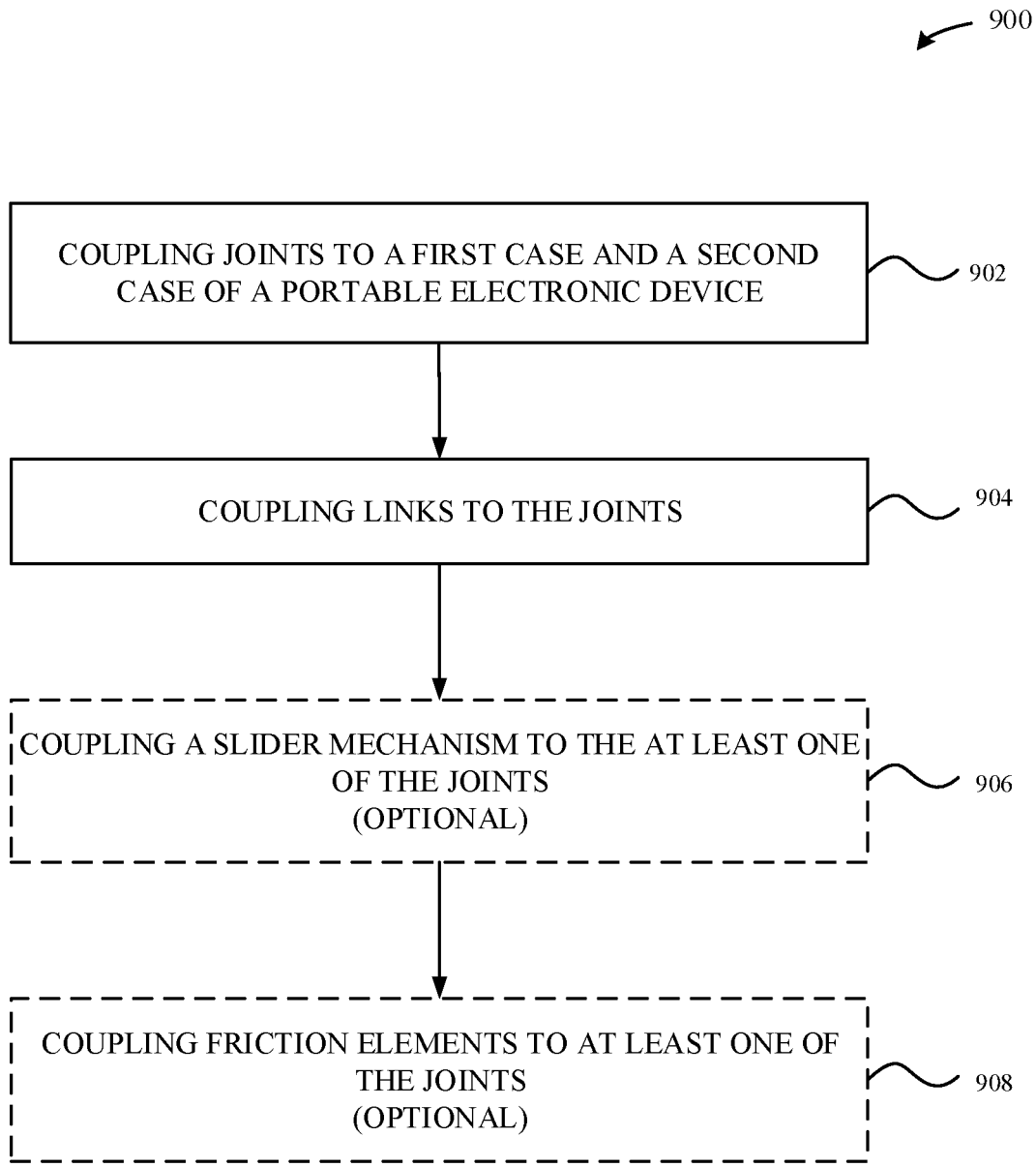
FIG. 9 illustrates a flowchart for assembling a linkage assembly of a portable electronic device, in accordance with some embodiments.

FIG. 9 illustrates a flow diagram of a method 900 for forming a linkage assembly for a portable electronic device—e.g., the portable electronic device 100, in accordance with some embodiments. As illustrated in FIG. 9, at step 902, the joints A, B, C, D are coupled to at least one of a first case (e.g., the lid portion 108) or a second case (e.g., the base portion 110).

At step 904, the links $L_r$, $L_c$, $L_f$, and $L_g$ are coupled to the joints A, B, C, D.

At step 906, a slider mechanism—e.g., the slider mechanism 420—may be optionally coupled to at least one of the joints.

At step 908, a friction element—e.g., the friction—inducing element 422—may be optionally coupled to at least one of the joints.

Figure 10:
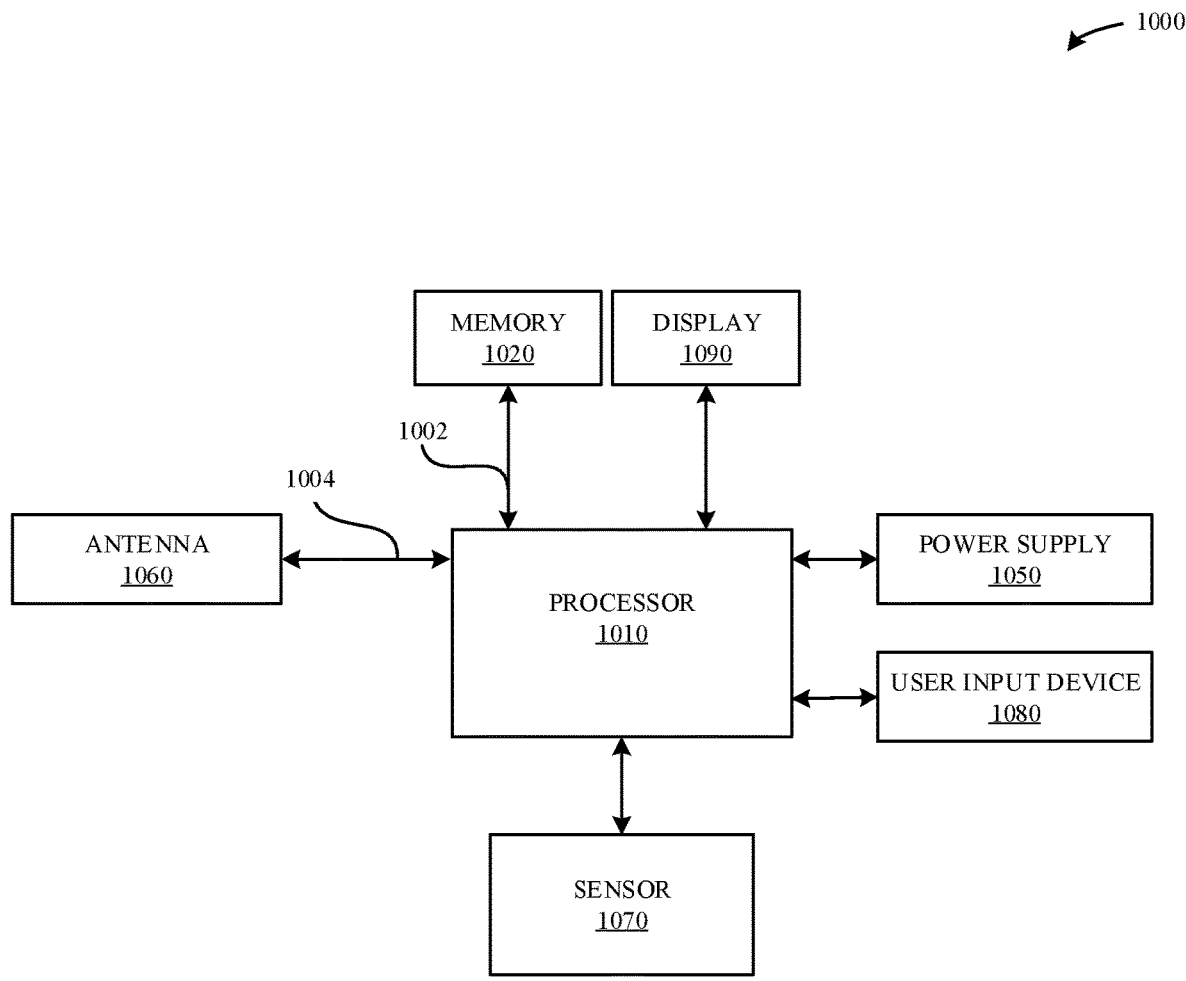
FIG. 10 illustrates a system diagram of a portable electronic device, in accordance with some embodiments.

FIG. 10 illustrates a system diagram of a portable electronic device 1000 that is capable of implementing the various techniques described herein, according to some embodiments. In particular, the detailed view illustrates various components that can be included in the portable electronic device 100 as illustrated in FIG. 1.

As shown in FIG. 10, the portable electronic device 1000 can include a processor 1010 for controlling the overall operation of the portable electronic device 1000. The portable electronic device 1000 can include a display 1090. The display 1090 can be a touch screen panel that can include a sensor (e.g., capacitance sensor). The display 1090 can be controlled by the processor 1010 to display information to the user. A data bus 1002 can facilitate data transfer between at least one memory 1020 and the processor 1010. A network interface 1004 can facilitate data transfer between an antenna 1060 and the processor 1010.

The portable electronic device 1000 can include a user input device 1080, such as a switch, a keyboard, a touchpad, etc. In some embodiments, the portable electronic device 1000 includes a sensor 1070, such as a magnetic sensor or a light sensor as described herein. The portable electronic device 1000 includes a power supply unit 1050, such as a lithium-ion battery.

The portable electronic device 1000 also includes a memory 1020, which can comprise a single disk or multiple disks (e.g., hard drives), and includes a storage management module that manages one or more partitions within the memory 1020. In some embodiments, the memory 1020 can include flash memory, semiconductor (solid state) memory or the like. The portable electronic device 1000 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

Any ranges cited herein are inclusive. The terms "substantially", "generally," and "about" used herein are used to describe and account for small fluctuations. For example, they can refer to less than or equal to ±5%, such as less than or equal to ±2%, such as less than or equal to ±1%, such as less than or equal to ±0.5%, such as less than or equal to ±0.1%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described above, one aspect of the present technology is the gathering and use of data available from various sources to improve the delivery to users of personal content or any other content that may be of interest to them. The present disclosure contemplates that in some instances, this gathered data may include personal information data that uniquely identifies or can be used to contact or locate a specific person. Such personal information data can include demographic data, location—based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well—established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction—specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de—identification can be used to protect a user's privacy. De—identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

What is claimed is:

1. A portable electronic device, comprising:
 a housing including (i) a first case, and (ii) a second case coupled to the first case; and
 a linkage assembly including:
  a first joint that is joined to the first case,
  a second joint that is joined to the first case,
  a third joint that is joined to the second case, wherein the second joint and the third joint define a first link, and
  a fourth joint that is joined to the second case, wherein the first joint and the fourth joint define a second link, and wherein a first input applied to the second link moves the second link and first link such that the first case pivots relative to the second case; and
 a slider mechanism that is joined to at least one of the first joint, the second joint, the third joint, or the fourth joint, wherein a second input to the slider mechanism adjusts an angle of the first case relative to the second case, the second input different from the first input.

2. The portable electronic device of claim 1, wherein the first link is longer than the second link.

3. The portable electronic device of claim 1, wherein the linkage assembly has 1-degree of freedom (DOF).

4. The portable electronic device of claim 1, wherein at least one of the first joint, the second joint, the third joint, or the fourth joint includes a friction-inducing element.

5. The portable electronic device of claim 4, wherein the friction-inducing element comprises a magnet or a detent.

6. The portable electronic device of claim 1, wherein the second case includes a linkage assembly—receiving feature that is capable of carrying the linkage assembly.

7. The portable electronic device of claim 1, wherein:
 the linkage assembly is coupled to a chassis,
 the chassis is capable of pivoting relative to the first case and the second case, and the chassis carries at least one of a keyboard, a touchpad, or speakers.

8. A portable electronic device including a housing having (i) a first housing part, and (ii) a second housing part, the portable electronic device comprising:
 a linkage assembly that is (i) joined to the first housing part and the second housing part, and (ii) capable of pivoting the first housing part relative to the second housing part, the linkage assembly including:
  a first link that is joined to a first joint and a second joint of the first housing part,
  a second link that is joined to the second joint and a third joint of the second housing part,
  a third link that is joined to the third joint and a fourth joint of the second housing part, and
  a fourth link that is joined to the first joint and the fourth joint, wherein the second link is longer than the fourth link such that when an input force is applied to the fourth link that causes the fourth link to oscillate, the oscillation of the fourth link drives the second link, causing the housing to transition between an open configuration to a closed configuration.

9. The portable electronic device of claim 8, wherein at least one of the first joint, the second joint, the third joint, or the fourth joint includes a friction-inducing element.

10. The portable electronic device of claim 8, wherein the linkage assembly further includes:
 a slider mechanism that is coupled to the second link, wherein the slider mechanism is capable of extending a length of the second link.

11. The portable electronic device of claim 8, wherein the linkage assembly has 1-degree of freedom (DOF).

12. The portable electronic device of claim 8, wherein in the closed configuration, the first, second, third, and fourth links of the linkage assembly define a parallelogram shape.

13. The portable electronic device of claim 8, wherein the linkage assembly is coupled to a chassis is capable of being raised relative to the first housing part while the housing is in the open configuration.

14. A portable electronic device, comprising:
 a first case;
 a second case; and
 a linkage assembly that pivotally couples the first case with the second case, wherein the linkage assembly includes:
  a first link that is coupled to a first set of joints, wherein the first set of joints are coupled to the first case and the second case, and
  a second link that is longer than the first link, the second link coupled to (i) the first link, and (ii) a second set of joints of the first case and the second case, wherein when the first case and the second case define a closed configuration and an input force is applied to the first link, (i) the first link translates in a first direction towards the second link, and (ii) the second link translates in a second direction that causes the first case and the second case to transition from the closed configuration to an open configuration, the second direction being different from the first direction.

15. The portable electronic device of claim 14, wherein in the open configuration, the first link and second link are inverted relative to each other.

16. The portable electronic device of claim 14, further comprising:
 a chassis that is coupled to the linkage assembly, wherein the chassis carries an input device, and wherein the chassis is capable of raised relative to the first case.

17. The portable electronic device of claim 14, wherein the first case and the second case are capable of pivoting between angles of about 0° to about 135°.

18. The portable electronic device of claim 14, wherein the first case includes a linkage assembly—receiving feature that is capable of carrying the linkage assembly.

19. The portable electronic device of claim 14, wherein the second case carries a keyboard and a touch pad, and wherein the keyboard and the touch pad elevate with an elevation of the second case.

20. The portable electronic device of claim 1, wherein the first case carries a display, and wherein the second case carries a keyboard.

* * * * *

UNITED STATES PATENT AND TRADEMARK OFFICE
CERTIFICATE OF CORRECTION

PATENT NO. : 10,761,571 B1
APPLICATION NO. : 16/424332
DATED : September 1, 2020
INVENTOR(S) : Cooper et al.

It is certified that error appears in the above-identified patent and that said Letters Patent is hereby corrected as shown below:

In the Specification

At Column 6, Line 25: "a third link ($L_f$)." should read -- a third link ($L_r$). --.

At Column 9, Lines 44-45: "the linkage assembly 302 includes links $L_g$, $L_f$, $L_c$, and $L_r$. these links may be fixed" should read -- The linkage assembly 302 includes links $L_g$, $L_f$, $L_c$, and $L_r$. These links may be fixed --.

At Column 13, Line 50: "the keyboard MO." should read -- the keyboard 140. --.

Signed and Sealed this
Twentieth Day of October, 2020

Andrei Iancu
*Director of the United States Patent and Trademark Office*